US010715734B2

(12) United States Patent
Sakuragi

(10) Patent No.: US 10,715,734 B2
(45) Date of Patent: Jul. 14, 2020

(54) BIRD'S-EYE VIEW VIDEO GENERATION DEVICE, BIRD'S-EYE VIEW VIDEO GENERATION METHOD, AND NON-TRANSITORY STORAGE MEDIUM

(71) Applicant: JVC KENWOOD Corporation, Yokohama-shi, Kanagawa (JP)

(72) Inventor: Tomoki Sakuragi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 16/424,704

(22) Filed: May 29, 2019

(65) Prior Publication Data

US 2019/0281229 A1 Sep. 12, 2019

Related U.S. Application Data

(63) Continuation of application No. PCT/JP2017/039368, filed on Oct. 31, 2017.

(30) Foreign Application Priority Data

Feb. 28, 2017 (JP) ................................. 2017-036658

(51) Int. Cl.
*G06T 7/10* (2017.01)
*H04N 5/232* (2006.01)
(Continued)

(52) U.S. Cl.
CPC ......... *H04N 5/232941* (2018.08); *B60R 1/00* (2013.01); *B60R 21/00* (2013.01);
(Continued)

(58) Field of Classification Search
CPC ........ B60R 2300/607; B60R 2300/303; B60R 2300/301; B60R 1/00; B60R 21/00;
(Continued)

(56) References Cited

U.S. PATENT DOCUMENTS 8,295,644 B2 * 10/2012 Shulman ............ G01C 21/3647
382/298
8,581,984 B2 * 11/2013 Yamamoto ............. H04N 7/181
348/148
(Continued)

FOREIGN PATENT DOCUMENTS

JP 2007104373 A * 4/2007
JP 4883977 B2 * 2/2012
(Continued)

OTHER PUBLICATIONS

International Search Report and Written Opinion for International Patent Application No. PCT/JP2017/039368 dated Jan. 23, 2018, 11 pages.

*Primary Examiner* — Philip P. Dang
(74) *Attorney, Agent, or Firm* — Amin, Turocy & Watson LLP

(57) ABSTRACT

A bird's-eye view video generation device includes a video data acquisition unit configured to acquire video data from multiple cameras configured to capture videos of surroundings of a vehicle, a bird's-eye view video generator configured to generate a bird's-eye view video from a virtual viewpoint above the vehicle by performing viewpoint conversion processing on the acquired video data to synthesize the viewpoint-converted videos, an obstacle information acquisition unit configured to acquire information from at least one detector configured to detect at least one obstacle around the vehicle and to specify a position thereof, and a display controller configured to display the bird's-eye view video in a display, wherein, when the position of the obstacle overlaps a synthesis boundary between the videos, the bird's-eye view video generator is further configured to
(Continued)

generate a bird's-eye view video obtained by changing the position of the virtual viewpoint of the bird's-eye view video.

7 Claims, 10 Drawing Sheets

(51) Int. Cl.
| | |
|---|---|
| *G06T 3/40* | (2006.01) |
| *H04N 5/225* | (2006.01) |
| *H04N 5/247* | (2006.01) |
| *H04N 7/18* | (2006.01) |
| *G06T 1/00* | (2006.01) |
| *B60R 21/00* | (2006.01) |
| *B60R 1/00* | (2006.01) |

(52) U.S. Cl.
CPC .............. *G06T 1/00* (2013.01); *G06T 3/4038* (2013.01); *H04N 5/2253* (2013.01); *H04N 5/23238* (2013.01); *H04N 5/247* (2013.01); *H04N 7/18* (2013.01); *H04N 7/181* (2013.01); *B60R 2300/301* (2013.01); *B60R 2300/303* (2013.01); *B60R 2300/607* (2013.01); *G06T 2207/30252* (2013.01)

(58) Field of Classification Search
CPC .. H04N 5/232941; H04N 7/18; H04N 5/2253; H04N 7/181; H04N 5/247; H04N 5/23238; G06T 1/00; G06T 3/4038; G06T 2207/30252
See application file for complete search history.

(56) References Cited

U.S. PATENT DOCUMENTS

| | | | |
|---|---|---|---|
| 9,728,228 B2* | 8/2017 | Palmer | ................ G11B 27/105 |
| 9,776,566 B2* | 10/2017 | Ishimoto | .................. B60R 1/00 |
| 10,474,898 B2* | 11/2019 | Watanabe | ................ G06T 1/00 |
| 2012/0170812 A1 | 7/2012 | Kamiyama | |
| 2017/0096106 A1 | 4/2017 | Higuchi et al. | |

FOREIGN PATENT DOCUMENTS

| | | | | |
|---|---|---|---|---|
| JP | 2015210649 A | * | 11/2015 | .............. B60R 1/00 |
| WO | 2011-036892 | | 3/2011 | |
| WO | 2015-194501 | | 12/2015 | |

\* cited by examiner

BIRD'S-EYE VIEW VIDEO GENERATION DEVICE, BIRD'S-EYE VIEW VIDEO GENERATION METHOD, AND NON-TRANSITORY STORAGE MEDIUM

CROSS-REFERENCE TO RELATED APPLICATIONS

This application is a continuation of PCT International Application No. PCT/JP2017/039368 filed in Japan on Oct. 31, 2017, which claims priority to and incorporates by references the entire contents of Japanese Patent Application No. 2017-036658 filed in Japan on Feb. 28, 2017.

FIELD

The present application relates to a bird's-eye view video generation device, a bird's-eye view video generation system, a bird's-eye view video generation method, and a non-transitory storage medium.

BACKGROUND

A technology of capturing a plurality of videos of surroundings of a vehicle with a plurality of cameras that are arranged around the vehicle and displaying, on a monitor, a bird's-eye view video obtained by performing viewpoint conversion processing on the captured videos and synthesizing the captured videos is known. A bird's-eye view video is obtained by synthesizing the videos and thus, a part of an object in the captured videos may be not displayed or may be not displayed temporarily at a synthesis boundary at which the videos are synthesized, when the object steps over the synthesis boundary.

A technology of creating a bird's-eye view image in which an obstacle and a synthesis boundary between images of a plurality of cameras do not overlap each other based on information from an obstacle move direction estimator is known (for example, see International Publication Pamphlet No. WO 2011/036892).

SUMMARY

When a vehicle moves, a position of an obstacle shifts relatively. Accordingly, in the above described technology, the synthesis boundary in the bird's-eye view video changes dynamically. The dynamic change of the synthesis boundary in the bird's-eye view video has a risk of becoming complicated. Thus, there is room for improvement in displaying a detected obstacle in a bird's-eye view video.

A bird's-eye view video generation device, a bird's-eye view video generation system, a bird's-eye view video generation method, and a non-transitory storage medium are disclosed.

According to one aspect, there is provided a bird's-eye view video generation device comprising: a video data acquisition unit configured to acquire video data from a plurality of cameras configured to capture videos of surroundings of a vehicle; a bird's-eye view video generator configured to generate a bird's-eye view video from a virtual viewpoint above the vehicle by performing viewpoint conversion processing on the video data acquired by the video data acquisition unit to synthesize the viewpoint-converted videos; an obstacle information acquisition unit configured to acquire information from at least one detector configured to detect at least one obstacle around the vehicle and to specify a position of the detected obstacle on the bird's-eye view video; and a display controller configured to display the bird's-eye view video in a display, wherein, when the position of the obstacle that is specified by the obstacle information acquisition unit overlaps a synthesis boundary between the videos in the bird's-eye view video, the bird's-eye view video generator is further configured to generate a bird's-eye view video obtained by changing the position of the virtual viewpoint of the bird's-eye view video to a position from which the obstacle does not overlap the synthesis boundary in the bird's-eye view video.

According to one aspect, there is provided a bird's-eye view video generation method comprising: acquiring video data from a plurality of cameras that capture videos of surroundings of a vehicle; generating a bird's-eye view video from a virtual viewpoint above the vehicle by performing viewpoint conversion processing on the acquired video data to synthesize the viewpoint-converted videos; acquiring information from at least one detector configured to detect at least one obstacle around the vehicle and to specify a position of the detected obstacle on the bird's-eye view video; and displaying the bird's-eye view video in a display, wherein, on generating the bird's-eye view video, when the specified position of the obstacle overlaps a synthesis boundary between the videos in the bird's-eye view video, generating the bird's-eye view video obtained by changing the position of the virtual viewpoint of the bird's-eye view video to a position from which the obstacle does not overlap the synthesis boundary in the bird's-eye view video.

According to one aspect, there is provided a non-transitory storage medium that stores a program for causing a computer that operates as a bird's-eye view video generation device to perform a process comprising: acquiring video data from a plurality of cameras that capture videos of surroundings of a vehicle; generating a bird's-eye view video from a virtual viewpoint above the vehicle by performing viewpoint conversion processing on the acquired video data to synthesize the viewpoint-converted videos; acquiring information from at least one detector configured to detect at least one obstacle around the vehicle and to specify a position of the detected obstacle on the bird's-eye view video; and displaying the bird's-eye view video in a display, wherein, on generating the bird's-eye view video, when the specified position of the obstacle overlaps a synthesis boundary between the videos in the bird's-eye view video, generating the bird's-eye view video obtained by changing the position of the virtual viewpoint of the bird's-eye view video to a position from which the obstacle does not overlap the synthesis boundary in the bird's-eye view video.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

With reference to the accompanying drawings, embodiments of a bird's-eye view video generation device 40, a bird's-eye view video generation system 1, a bird's-eye view video generation method, and a program will be described in detail below. Note that the following embodiments do not limit the present application.

In the following descriptions, a longitudinal direction refers to a direction that is parallel to a direction in which a vehicle goes straight, a side of a wind shield against a driver seat refers to a "front" in the longitudinal direction, and a side of the driver seat against the wind shield refers to a "rear" in the longitudinal direction. The longitudinal direction is referred to as an X-axis direction. A lateral direction refers to a direction that is orthogonal to the longitudinal direction. A left side for the windshield refers to a "left" and a right side for the windshield refers to a "right". The lateral direction is referred to as a Y-axis direction. A vertical direction refers to a direction that is orthogonal to the longitudinal direction and the lateral direction. The vertical direction is referred to as a Z-axis direction. Accordingly, the longitudinal direction, the lateral direction and the vertical direction are orthogonal with one another three-dimensionally. The front and the rear, the left and the right, and the top and the bottom in the following descriptions refer to a front and a rear, a left and a right, and a top and a bottom of the vehicle with the bird's-eye view video generation system 1 mounted thereon.

First Embodiment

Figure 1:
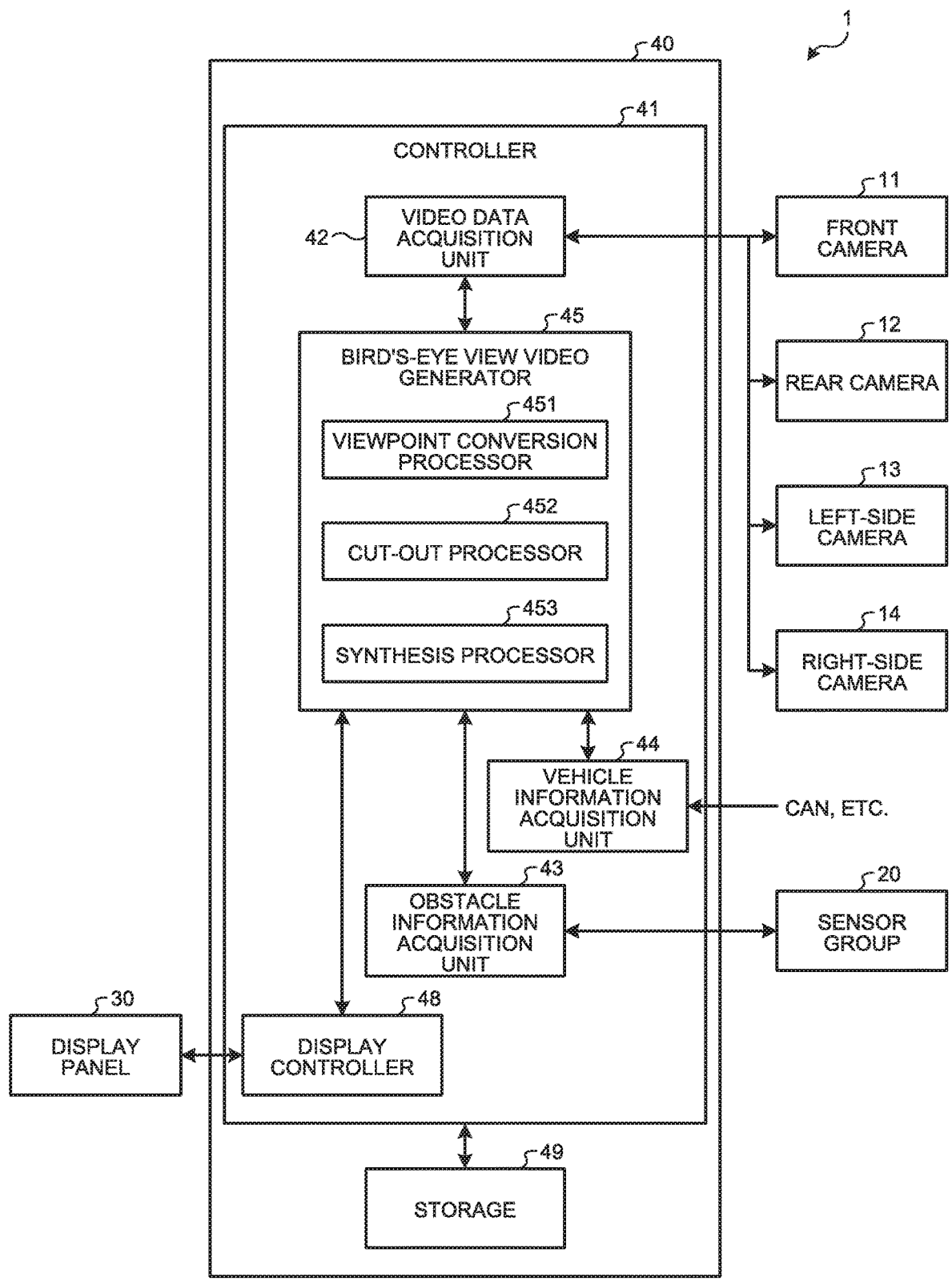
FIG. 1 is a block diagram illustrating an exemplary configuration of a bird's-eye view video generation system according to a first embodiment.

FIG. 1 is a block diagram illustrating an exemplary configuration of a bird's-eye view video generation system according to a first embodiment. The bird's-eye view video generation system 1 is mounted on a vehicle V. The bird's-eye view video generation system 1 may be a device mounted on the vehicle V or a device that is portable and usable in the vehicle V.

Using FIG. 1, the bird's-eye view video generation system 1 will be described. The bird's-eye view video generation system 1 includes a front camera 11, a rear camera 12, a left-side camera 13, a right-side camera 14, a sensor group (detector) 20, a display panel (display) 30, and the bird's-eye view video generation device 40.

Figure 2:
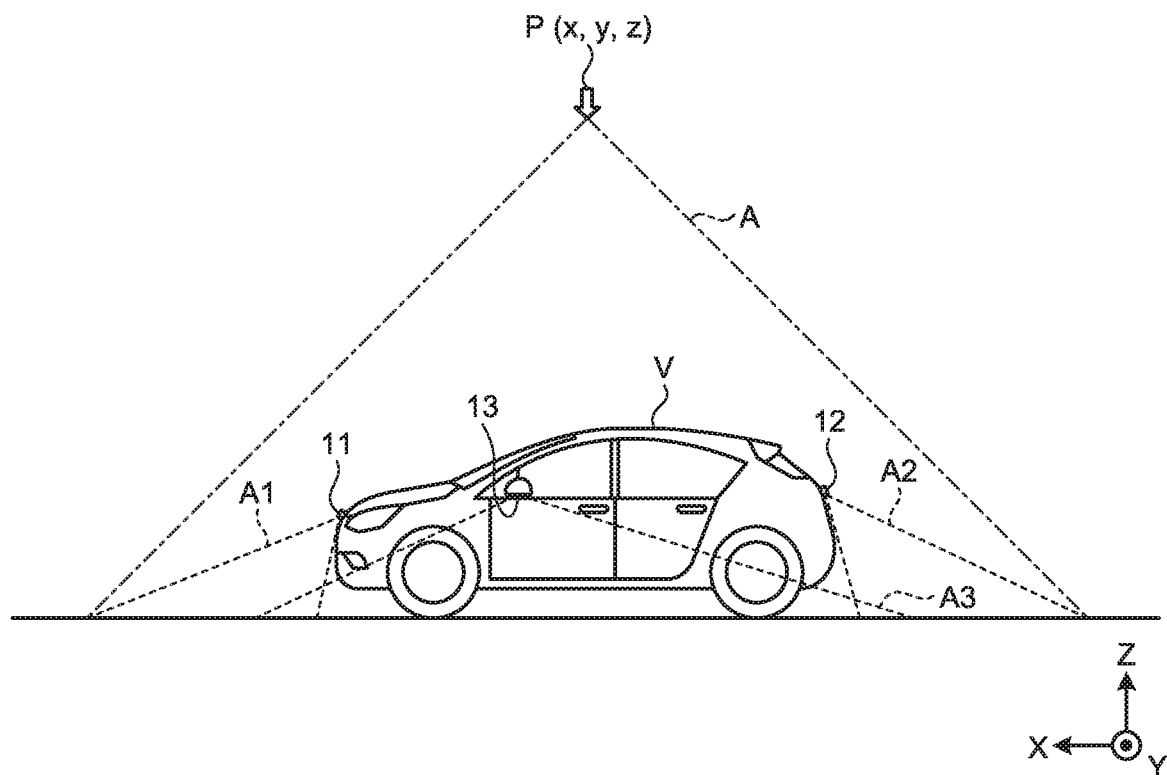
FIG. 2 is a schematic diagram to explain an example of a position of a virtual viewpoint in the bird's-eye view video generation system according to the first embodiment.

Using FIG. 2, the front camera 11, the rear camera 12, the left-side camera 13, and the right-side camera 14 will be described. FIG. 2 is a schematic diagram to explain an example of a position of a virtual viewpoint in the bird's-eye view video generation system according to the first embodiment. The front camera 11 is arranged on a front of the vehicle V and captures a video of surroundings around the front of the vehicle V. The front camera 11 captures a video of, for example, an imaging area A1 of approximately 180°. The front camera 11 outputs the captured video to a video data acquisition unit 42 of the bird's-eye view video generation device 40.

The rear camera 12 is arranged on a rear of the vehicle V and captures a video of surroundings around the rear of the vehicle V. The rear camera 12 captures a video of, for example, an imaging area A2 of approximately 180°. The rear camera 12 outputs the captured video to the video data acquisition unit 42 of the bird's-eye view video generation device 40.

The left-side camera 13 is arranged on a left side of the vehicle V and captures a video of surroundings around the left side of the vehicle V. The left-side camera 13 captures a video of, for example, an imaging area A3 of approximately 180°. The left-side camera 13 outputs the captured video to the video data acquisition unit 42 of the bird's-eye view video generation device 40.

The right-side camera 14 is arranged on a right side of the vehicle V and captures a video of surroundings around the right side of the vehicle V. The right-side camera 14 captures a video of, for example, an imaging area A4 of approximately 180°. The right-side camera 14 outputs the captured video to the video data acquisition unit 42 of the bird's-eye view video generation device 40.

The front camera 11, the rear camera 12, the left-side camera 13, and the right-side camera 14 capture videos in all directions of the vehicle V.

FIG. 1 will be referred back here. The sensor group 20 detects an obstacles Q around the vehicle V. The sensor group 20 is capable of detecting the obstacles Q within an area containing an area in which a bird's-eye view video is displayed. In the present embodiment, the sensor group 20 includes a front sensor, a rear sensor, a left-side sensor, and a right-side sensor. The sensor group 20 is capable of performing sensing within a distance of few tens of meters to few hundreds of meters depending on a sensing system. However, when the sensor group 20 is used for the present purpose, the sensor group 20 detects the obstacle Q within a distance of up to approximately five meters from the vehicle V. For the sensor group 20, various systems, such as a combination of sensors of multiple systems including an infrared sensor, an ultrasonic sensor, a millimeterwave sensor, and a sensor using image recognition, may be used.

The front sensor is arranged on the front of the vehicle V and detects the obstacle Q that is present in an area around the front of the vehicle V. The front sensor detects an object that has a risk of contact with the vehicle V when the vehicle V is going forward and that is higher than the ground. The front sensor, for example, detects the obstacle Q within a distance of approximately five meters from the vehicle V. The detection area of the front sensor overlaps the imaging area A1 of the front camera 11. The detection area of the front sensor may overlap a part of detection area of the left-side sensor and a part of detection area of the right-side sensor. The front sensor is formed of a combination of multiple sensors. Accordingly, the front sensor detects the obstacles Q in segmented directions. The front sensor outputs obstacle information on the detected obstacle Q to an obstacle information acquisition unit 43 of the bird's-eye view video generation device 40.

The rear sensor is arranged on the rear of the vehicle V and detects the obstacle Q that is present in an area around the rear of the vehicle V. The rear sensor detects an object that has a risk of contact with the vehicle V when the vehicle V is reversing and that is higher than the ground. The rear sensor, for example, detects the obstacle Q within a distance of up to about five meters from the vehicle V. The detection area of the rear sensor overlaps the imaging area A2 of the rear camera 12. The detection area of the rear sensor may overlap a part of the detection area of the left-side sensor and a part of the detection area of the right-side sensor. The rear sensor is formed of a combination of multiple sensors. Accordingly, the rear sensor detects the obstacle Q in segmented directions. The rear sensor outputs obstacle information on the detected obstacle Q to the obstacle information acquisition unit 43 of the bird's-eye view video generation device 40.

The left-side sensor is arranged on the left side of the vehicle V and detects the obstacle Q that is present in an area around the left side of the vehicle V. The left-side sensor detects an object that has a risk of contact with the vehicle V when the vehicle V is going forward or reversing while being steered and that is higher than the ground. The left-side sensor, for example, detects the obstacle Q within a distance of up to approximately five meters from the vehicle V. The detection area of the left-side sensor overlaps the imaging area A3 of the left-side camera 13. The detection area of the left-side sensor may overlap a part of the detection area of the front sensor and a part of the detection area of the rear sensor. The left-side sensor is formed of a combination of multiple sensors. Accordingly, the left-side sensor detects the obstacle Q in segmented directions. The left-side sensor outputs obstacle information on the detected obstacle Q to the obstacle information acquisition unit 43 of the bird's-eye view video generation device 40.

The right-side sensor is arranged on the right side of the vehicle V and detects the obstacle Q that is present in an area around the right side of the vehicle V. The right-side sensor detects an object that has a risk of contact with the vehicle V when the vehicle V is going forward or reversing while being steered and that is higher than the ground. The right-side sensor, for example, detects the obstacle Q within a distance of up to approximately five meters from the vehicle V. The detection area of the right-side sensor overlaps the imaging area A4 of the right-side camera 14. The detection area of the right-side sensor may overlap a part of the detection area of the front sensor and a part of the detection area of the rear sensor. The right-side sensor is formed of a combination of multiple sensors. Accordingly, the right-side sensor detects the obstacle Q in segmented directions. The right-side sensor outputs obstacle information on the detected obstacle Q to the obstacle information acquisition unit 43 of the bird's-eye view video generation device 40.

The display panel 30 is, for example, a display including a liquid crystal display (LCD) or an organic electro-luminescence (EL) display. The display panel 30 displays a bird's-eye view video 100 (refer to FIG. 3) and a bird's-eye view video 100A (refer to FIG. 6) based on video signals that are output from the bird's-eye view video generation device 40 of the bird's-eye view video generation system 1. The display panel 30 may be one dedicated to the bird's-eye view video generation system 1 or may be shared with other systems including a navigation system. The display panel 30 is arranged in a position easily viewable by a driver.

When a shape of the display panel 30 is of a landscape rectangle, the display panel 30 may be divided into a plurality of display areas. For example, the display panel 30 has a display area for the bird's-eye view video 100 and a display area that is arranged beside the display area for the bird's-eye view video 100 and in which a navigation screen and an audio screen are displayed. The display area for the bird's-eye view video 100 may have a shape of a portrait rectangle.

The bird's-eye view video generation device 40 includes a controller 41 and a storage 49.

The controller 41 is, for example, an arithmetic processing unit that is formed of a central processing unit (CPU), or the like. The controller 41 loads programs that are stored in the storage 49 and executes commands contained in the programs. The controller 41 includes the video data acquisition unit 42, the obstacle information acquisition unit 43, a vehicle information acquisition unit 44, a bird's-eye view video generator 45, and a display controller 48.

The video data acquisition unit 42 acquires surroundings video data obtained by capturing videos of the surroundings of the vehicle V. More specifically, the video data acquisition unit 42 acquires sets of surroundings video data that are output by the front camera 11, the rear camera 12, the left-side camera 13 and the right-side camera 14. The video data acquisition unit 42 outputs the acquired surroundings video data to the bird's-eye view video generator 45.

The obstacle information acquisition unit 43 acquires obstacle information on the obstacle Q that is detected around the vehicle V and specifies a position of the obstacle Q on the bird's-eye view video. More specifically, the obstacle information acquisition unit 43 acquires the obstacle information that is output by the sensor group 20. In the present embodiment, the obstacle information acquisition unit 43 acquires the obstacle information containing a distance to the detected obstacle Q. The obstacle information acquisition unit 43 specifies the positon of the obstacle Q on the bird's-eye view video by the distance between the sensor that detects the obstacle Q and the obstacle Q, which is contained in the acquired obstacle information. The obstacle information acquisition unit 43 outputs the acquired obstacle information and the specified position of the obstacle Q to the bird's-eye view video generator 45.

The vehicle information acquisition unit 44 acquires vehicle information, such as gear operation information on the vehicle V, serving as a trigger of display of the bird's-eye view video 100, from a CAN (Controller Area Network) and various sensors that sense a state of the vehicle V. In the present embodiment, the vehicle information includes information representing a direction to which the vehicle V travels. The vehicle information acquisition unit 44 outputs the acquired vehicle information to the bird's-eye view video generator 45.

The bird's-eye view video generator 45 generates the bird's-eye view video 100 from a virtual viewpoint P above the vehicle V by performing viewpoint conversion processing on the sets of surroundings video data and synthesizing the sets of surroundings video data.

Using FIG. 2, the virtual viewpoint P will be described. The virtual viewpoint P is positioned above the center of the vehicle V. The virtual viewpoint P is a viewpoint that looks down the vehicle V from a position right above the vehicle V. The center of the vehicle V is a center of the vehicle V in the lateral direction of the vehicle V and a center of the vehicle V in the longitudinal direction. The position right above the vehicle V is a position on a vertical line with respect to a reference plane of the vehicle V. The reference plane is a plane that is, when the vehicle V is positioned on a horizontal and flat road surface, parallel to the road surface. For the position of the virtual viewpoint P, (x,y,z) is set.

Figure 3:
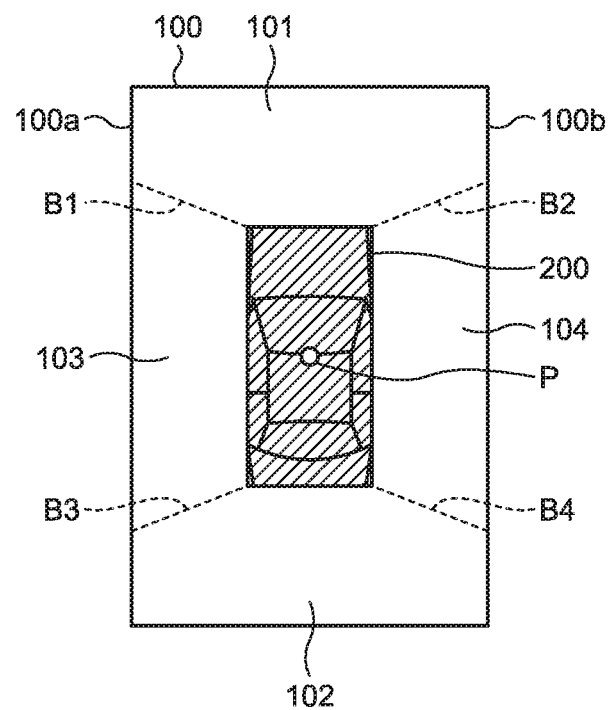
FIG. 3 is a diagram illustrating an example of a bird's-eye view video that is generated by the bird's-eye view video generation system according to the first embodiment.

Using FIG. 3, the generated bird's-eye view video 100 will be described. FIG. 3 is a diagram illustrating an example of a bird's-eye view video that is generated by the bird's-eye view video generation system according to the first embodiment. The bird's-eye view video 100 contains a front video 101, a rear video 102, a left-side video 103, and a right-side video 104. The display area of the front video 101 and the display area of the rear video 102 are equal to each other. The display area of the left-side video 103 and the display area of the right-side video 104 are equal to each other. At the center of the bird's-eye view video 100, a vehicle icon 200 representing the vehicle V is displayed. The vehicle icon 200 represents a mode in which the vehicle V is looked down from right above.

In FIG. 3, oblique dotted lines representing a synthesis boundary B1 between the front video 101 and the left-side video 103, a synthesis boundary B2 between the front video 101 and the right-side video 104, a synthesis boundary B3 between the rear video 102 and the left-side video 103, and a synthesis boundary B4 between the rear video 102 and the right-side video 104 are illustrated for explanation. However, the dotted lines may be or may not be displayed on the bird's-eye view video 100 that is practically displayed on the display panel 30. The same applies to other drawings. In the following descriptions, the synthesis boundary B1, the synthesis boundary B2, the synthesis boundary B3, and the synthesis boundary B4 will be described as a synthesis boundary B when they need not be particularly distinguished from one another.

The synthesis boundary B1 extends forward and to the left from the front left end of the vehicle icon 200. The synthesis boundary B1 extends from the front left end of the vehicle icon 200 to a long side 100a. The synthesis boundary B2 extends forward and to the right from the front right end of the vehicle icon 200. The synthesis boundary B2 extends from the front right end of the vehicle icon 200 to a long side 100b. The synthesis boundary B3 extends backward to the left from the rear left end of the vehicle icon 200. The synthesis boundary B3 extends from the rear left end of the vehicle icon 200 to the long side 100a. The synthesis boundary B4 extends backward to the right from the rear right end of the vehicle icon 200. The synthesis boundary B4 extends from the rear right end of the vehicle icon 200 to the long side 100b.

When the position of the obstacle Q that is specified by the obstacle information acquisition unit 43 overlaps the synthesis boundary B that is the boundary between a plurality of videos in the bird's-eye view video 100, the bird's-eye view video generator 45 changes the position of the virtual viewpoint P of the bird's-eye view video 100, thereby generating the bird's-eye view video 100A corresponding to a virtual viewpoint PA. In other words, if the position of the obstacle Q overlaps the synthesis boundary B when the obstacle Q is represented in the bird's-eye view video 100, the bird's-eye view video generator 45 generates the bird's-eye view video 100A corresponding to the virtual viewpoint PA. Furthermore, also if the position of the obstacle Q is located near the synthesis boundary B when the obstacle Q is represented in the bird's-eye view video 100, the bird's-eye view video generator 45 may generate the bird's-eye view video 100A corresponding to the virtual viewpoint PA.

A position overlapping the synthesis boundary B is a position that overlaps an area in which, when the videos are synthesized, the video-captured object is not displayed or distorted due to image processing and thus the video-captured object is not displayed in a correct mode. The position overlapping the synthesis boundary B is, for example, a position that overlaps an area spread in a beltlike shape centering the synthesis boundary B.

A position near the synthesis boundary B is a position in the travel direction with respect to the position overlapping the synthesis boundary B. A position near the synthesis boundary B is a position that is expected to be a position overlapping the synthesis boundary B when the vehicle V travels.

In the present embodiment, when the position of the obstacle Q that is specified by the obstacle information acquisition unit 43 overlaps the synthesis boundary B in the travel direction in the bird's-eye view video 100 ("travel-direction synthesis boundary B" below), the bird's-eye view video generator 45 generates the bird's-eye view video 100A obtained by changing the position of the virtual viewpoint P to the virtual viewpoint PA that corresponds to the direction in which the vehicle V travels. More specifically, when the position of the obstacle Q overlaps the travel-direction synthesis boundary B, the bird's-eye view video generator 45 generates the bird's-eye view video 100A obtained by changing the position of the virtual viewpoint P to the virtual viewpoint PA on the side of the direction in which the vehicle V travels. The position of the virtual viewpoint is represented by (xA,yA,zA).

For example, when the positon of the obstacle Q overlaps the synthesis boundary B3 or the synthesis boundary B4 while the vehicle V is reversing, the bird's-eye view video generator 45 generates the bird's-eye view video 100A obtained by changing the position of the virtual viewpoint P to the virtual viewpoint PA behind the vehicle V.

For example, when the positon of the obstacle Q overlaps the synthesis boundary B1 or the synthesis boundary B2 while the vehicle V is going forward, the bird's-eye view video generator 45 generates the bird's-eye view video 100A obtained by changing the position of the virtual viewpoint P to the virtual viewpoint PA in front of the vehicle V.

The bird's-eye view video generator 45 includes a viewpoint conversion processor 451, a cut-out processor 452, and a synthesis processor 453.

The viewpoint conversion processor 451 performs viewpoint conversion processing on the surroundings video data that is acquired by the video data acquisition unit 42 such that the vehicle V is looked down from the virtual viewpoint P above the vehicle V. More specifically, the viewpoint conversion processor 451 generates a video obtained by performing the viewpoint conversion processing based on the surroundings video data obtained by capturing the videos with the front camera 11, the rear camera 12, the left-side camera 13, and the right-side camera 14. The method of the viewpoint conversion processing may be any known method and is not limited. The viewpoint conversion processor 451 outputs the surroundings video data on which the viewpoint conversion processing has been performed to the cut-out processor 452.

When the position of the obstacle Q that is specified by the obstacle information acquisition unit 43 overlaps the synthesis boundary B of the bird's-eye view video 100, the viewpoint conversion processor 451 generates a video obtained by performing the viewpoint conversion processing using the virtual viewpoint PA to which the position of the virtual viewpoint P of the bird's-eye view video 100 is changed. The viewpoint conversion processor 451 outputs the surroundings video data on which the viewpoint conversion processing has been performed to the cut-out processor 452.

In the present embodiment, the viewpoint conversion processor 451 changes the position of the virtual viewpoint P such that a display area, after changing the position of the virtual viewpoint, of the viewpoint-converted video of the plurality of cameras in which the obstacle is contained becomes wider than that of the viewpoint-converted video before changing the position of the virtual viewpoint.

In the present embodiment, when the position of the obstacle Q that is specified by the obstacle information acquisition unit 43 overlaps the travel-direction synthesis boundary B, the viewpoint conversion processor 451 generates a video obtained by performing the viewpoint conversion processing by changing the position of the virtual viewpoint P to the position corresponding to the direction in which the vehicle V travels. More specifically, when the positon of the obstacle Q overlaps the travel-direction synthesis boundary B, the viewpoint conversion processor 451 generates a video obtained by performing the viewpoint conversion processing by changing the position of the virtual viewpoint P to the side of the direction in which the vehicle V travels.

For example, when the position of the obstacle Q overlaps the synthesis boundary B3 or the synthesis boundary B4 while the vehicle V is reversing, the viewpoint conversion processor 451 generates a video obtained by performing the viewpoint conversion processing by changing the position of the virtual viewpoint P to the virtual viewpoint PA behind the vehicle V.

Figure 4:
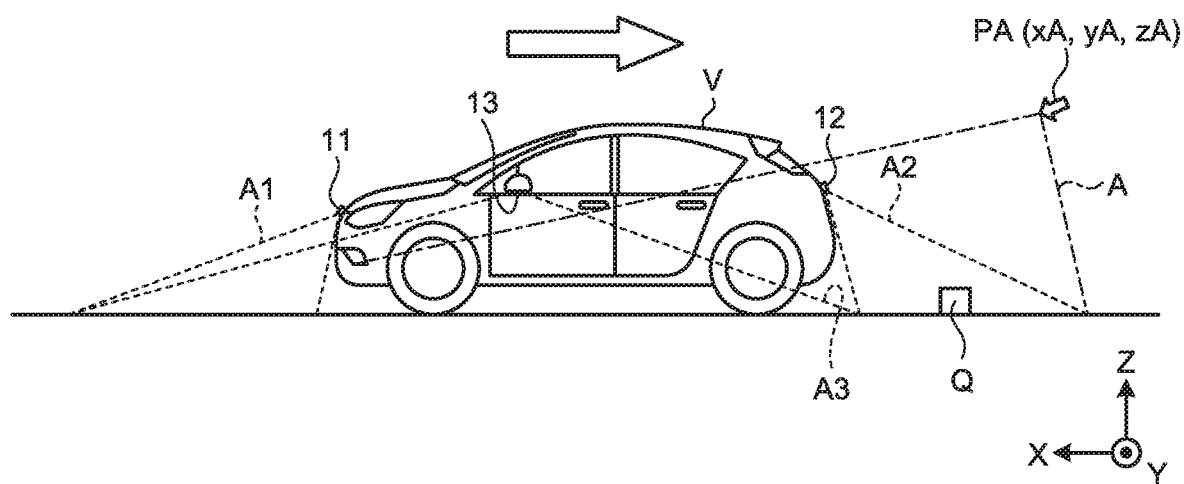
FIG. 4 is a schematic diagram to explain another example of the position of the virtual viewpoint in the bird's-eye view video generation system according to the first embodiment.

Using FIG. 4, the virtual viewpoint PA will be described. FIG. 4 is a schematic diagram to explain another example of the position of the virtual viewpoint in the bird's-eye view video generation system according to the first embodiment. In the present embodiment, the virtual viewpoint PA is positioned behind and above the vehicle V. The virtual viewpoint PA is a viewpoint that looks down the vehicle V obliquely from behind and above the vehicle V.

For example, when the position of the obstacle Q overlaps the synthesis boundary B1 or the synthesis boundary B2 while the vehicle is going forward, the viewpoint conversion processor 451 generates a video obtained by performing the viewpoint conversion processing by changing the position of the virtual viewpoint P to the virtual viewpoint PA in front of the vehicle V.

The cut-out processor 452 performs cut-out processing of cutting videos of predetermined areas out of the surroundings video data on which the viewpoint conversion processing has been performed. The cut-out processor 452 cuts a forward cut area out of the surroundings video data from the front camera 11 on which the viewpoint conversion processing has been performed. The cut-out processor 452 cuts a backward cut area from the surroundings video data out of the rear camera 12 on which the viewpoint conversion processing has been performed. The cut-out processor 452 cuts a left-side cut area out of the surroundings video data from the left-side camera 13 on which the viewpoint conversion processing has been performed. The cut-out processor 452 cuts a right-side cut area out of the surroundings video data from the right-side camera 14 on which the viewpoint conversion processing has been performed. The cut-out processor 452 outputs the video image data of the videos obtained by performing the cutting processing to the synthesis processor 453.

The forward cut area is an area in front of the front end of the vehicle V and is an area surrounded by the synthesis boundary B1 and the synthesis boundary B2. The backward cut area is an area behind the rear end of the vehicle V and is an area surrounded by the synthesis boundary B3 and the synthesis boundary B4. The left-side cut area is an area on the left of the left side of the vehicle V and is an area surrounded by the synthesis boundary B1 and the synthesis boundary B3. The right-side cut area is an area on the right of the right side of the vehicle V and is an area surrounded by the synthesis boundary B2 and the synthesis boundary B4.

The position of the synthesis boundaries B of the bird's-eye view video are defined uniquely according to the position of the virtual viewpoint. For this reason, the forward cut area, the backward cut area, the left-side cut area, and the right-side cut area are determined based on the positions of the synthesis boundaries B corresponding to the position of the virtual viewpoint of the video on which the cut-out processing has been performed. The positions of the synthesis boundaries B of the bird's-eye view video corresponding to the position of each virtual viewpoint are stored in the storage 49 in advance. In the present embodiment, the positions of the synthesis boundaries B of the bird's-eye view video 100 corresponding to the virtual viewpoint P and the positions of synthesis boundaries BA of the bird's-eye view video 100A corresponding to the virtual viewpoint PA are stored.

The synthesis processor 453 generates the bird's-eye view video 100 and the bird's-eye view video 100A by synthesizing the videos that are cut out by the cut-out processor 452. The synthesis processor 453 outputs the generated bird's-eye view video 100 and the bird's-eye view video 100A to the display controller 48.

Figure 5:
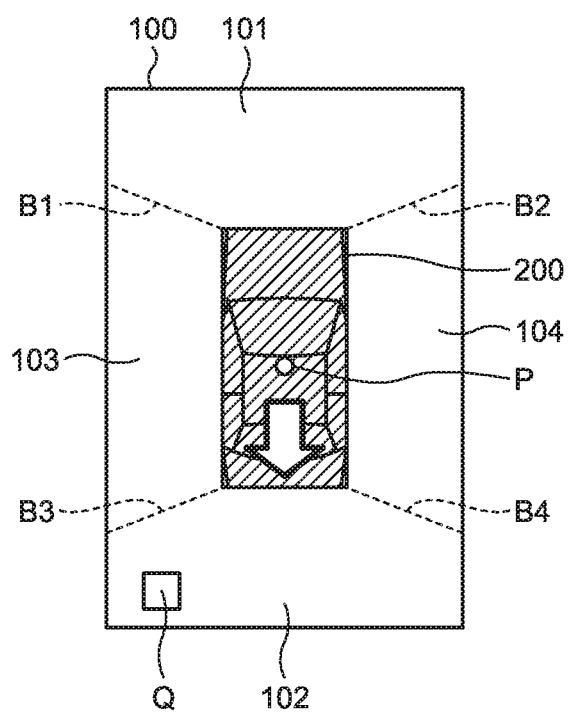
FIG. 5 is a diagram illustrating another example of the bird's-eye view video that is generated by the bird's-eye view video generation system according to the first embodiment.

Using FIG. 5, the generated bird's-eye view video 100 will be described. FIG. 5 is a diagram illustrating another example of the bird's-eye view video that is generated by the bird's-eye view video generation system according to the first embodiment. The obstacle icon Q representing the obstacle Q is displayed on the rear video 102.

Figure 6:
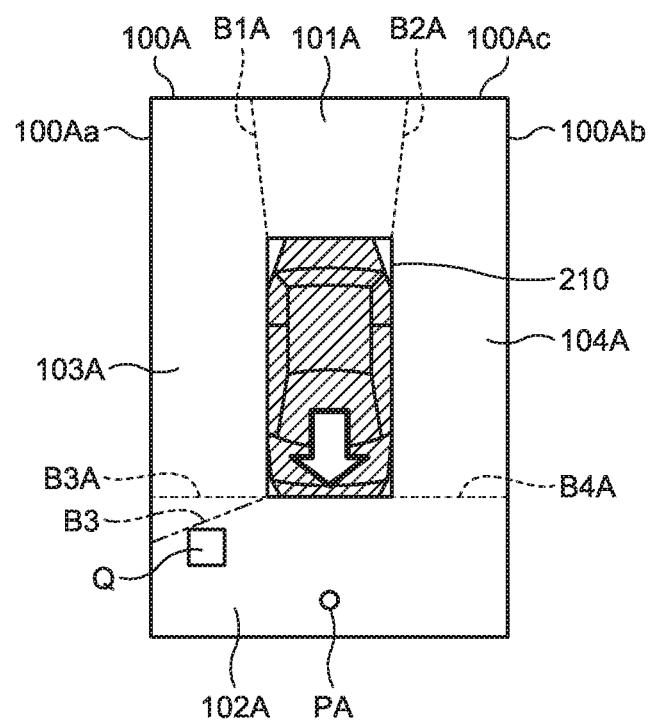
FIG. 6 is a diagram illustrating another example of the bird's-eye view video that is generated by the bird's-eye view video generation system according to the first embodiment.

Using FIG. 6, the generated bird's-eye view video 100 will be described. FIG. 6 is a diagram illustrating another example of the bird's-eye view video that is generated by the bird's-eye view video generation system according to the first embodiment. A vehicle icon 210 represents a mode where the vehicle V is looked down from behind. It is preferable that the vehicle icon 210 is of a display mode where no blind spot is caused by the vehicle icon 210. For example, the vehicle icon 210 may be semi-transparent. For example, the vehicle icon 210 may be a frame representing an outer shape. The display area of a front video 101A is narrower than the display area of the front video 101. The display area of a rear video 102A is wider forward at the ends on both sides than the display area of the rear video 102. The display area of the rear video 102A is wider than the display area of the front video 101A. The display area of a left-side video 103A and the display area of a right-side video 104A are wider forward than the display area of the left-side video 103 and the display area of the right-side video 104.

The synthesis boundary B1A extends forward from the front left end of the vehicle icon 210. The synthesis boundary B1A extends from the front left end of the vehicle icon 210 to a short side 100Ac. The synthesis boundary B2A extends forward from the front right end of the vehicle icon 210. The synthesis boundary B2A extends from the front right end of the vehicle icon 210 to the short side 100Ac. The synthesis boundary B3A horizontally extends leftward from the rear left end of the vehicle icon 210. The synthesis boundary B3A extends from the rear left end of the vehicle icon 210 to a long side 100Aa. The synthesis boundary B4A horizontally extends rightward from the rear right end of the vehicle icon 210. The synthesis boundary B4A extends from the rear right end of the vehicle icon 210 to a long side 100Ab.

Near the synthesis boundary B3A and the synthesis boundary B4A, the surroundings video data from the rear camera 12 has less distortion than that of the surroundings video data from the left-side camera 13 and the right-side camera 14. For this reason, the synthesis boundary B3A and the synthesis boundary B4A are set such that the display area of the surroundings video data from the rear camera 12 increases.

Near the synthesis boundary B1A and the synthesis boundary B2A, the surroundings video data from the left-side camera 13 and the right-side camera 14 has less distortion than that of the surroundings video data from the front camera 11. For this reason, the synthesis boundary B1A and the synthesis boundary B2A are set such that the display area of the surroundings video data from the left-side camera 13 and the right-side camera 14 increases.

FIG. 1 will be referred back. The display controller 48 causes the display panel 30 to display the bird's-eye view video 100 and the bird's-eye view video 100A.

The storage 49 stores data necessary for various types of processing performed by the bird's-eye view video generation device 40 and results of the various types of processing. The storage 49 is, for example, a semiconductor memory device, such as a random access memory (RAM), a read only memory (ROM) or a flash memory, or a storage device, such as a hard disk device or an optical disk.

Figure 7:
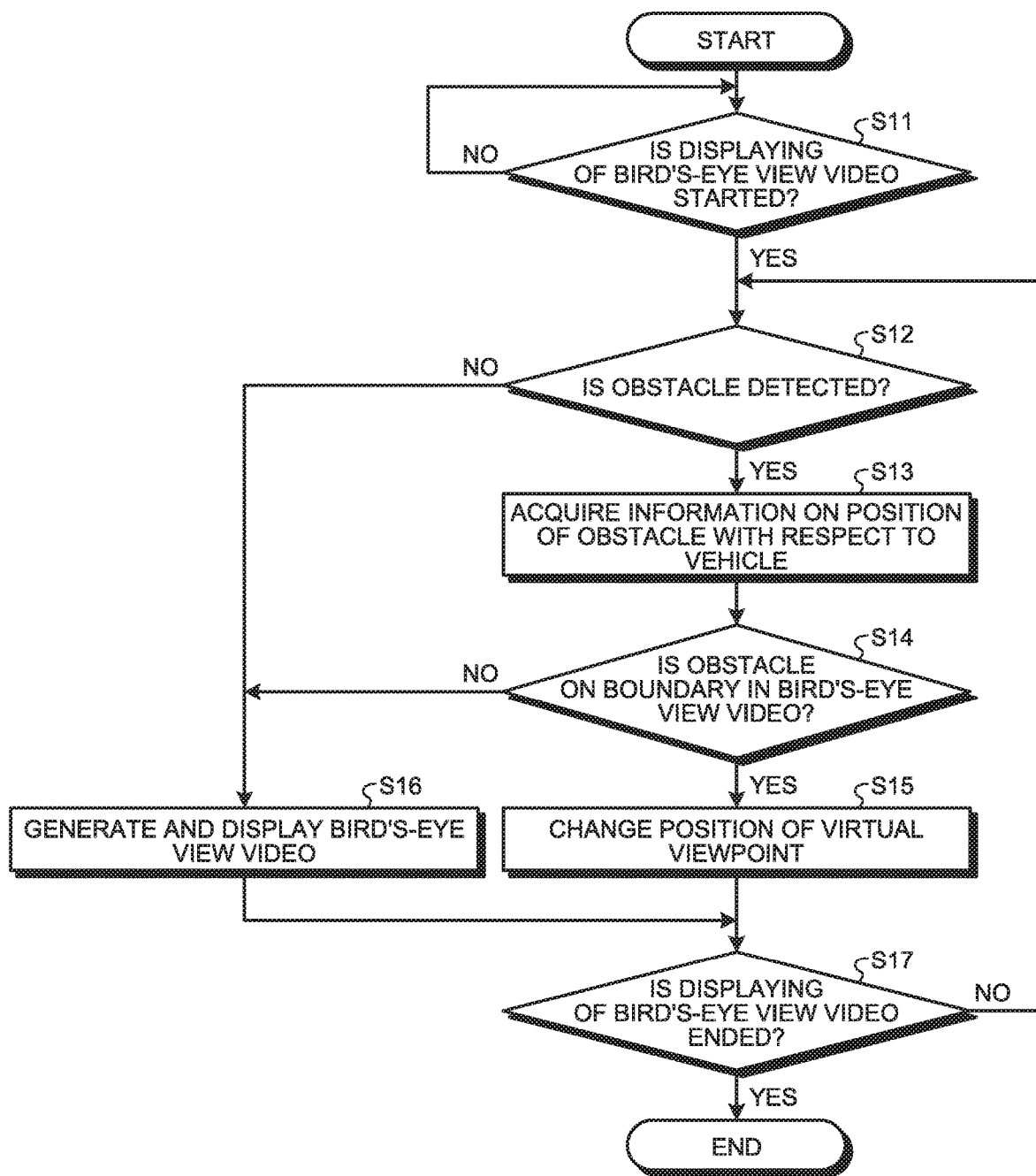
FIG. 7 is a flowchart illustrating a flow of processes in the bird's-eye view video generation system according to the first embodiment.

Using FIG. 7, a flow of processes performed by the bird's-eye view video generation device 40 of the bird's-eye view video generation system 1 will be described. FIG. 7 is a flowchart illustrating the flow of the processes performed by the bird's-eye view video generation system according to the first embodiment.

When the bird's-eye view video generation system 1 is started, the controller 41 causes the video data acquisition unit 42 to acquire surroundings video data. The controller 41 causes the obstacle information acquisition unit 43 to acquire obstacle information.

The controller 41 determines whether to start displaying a bird's-eye view video (step S11). In the present embodiment, the controller 41 determines whether to start displaying a bird's-eye view video based on presence or absence of a reverse trigger. The reverse trigger refers to, for example, a situation where the shift position is changed to the "reverse" position. Alternatively, the reverse trigger refers to a situation where the travel direction of the vehicle is backward. When the reverse trigger is absent, the controller 41 determines not to start displaying a bird's-eye view video (NO at step S11) and executes the process at step S11 again. When the reverse trigger is present, the controller 41 determines to start displaying a bird's-eye view video (YES at step S11) and proceeds to step S12. The trigger to start displaying a bird's-eye view video is not limited to the reverse trigger, and any trigger, such as a user operation, an obstacle detection result or a stop of the vehicle, may be used.

The controller 41 determines whether the obstacle Q is detected (step S12). More specifically, the controller 41 determines whether obstacle information on the obstacle Q that meets a predetermined condition is acquired. When it is determined that the obstacle information acquisition unit 43 acquires the obstacle information (YES at step S12), the controller 41 proceeds to step S13. When it is determined that the obstacle information acquisition unit 43 does not acquire obstacle information (NO at step S12), the controller 41 proceeds to step S16.

The predetermined condition is a condition for detecting the obstacle Q. In the embodiment, the predetermined condition is that the obstacle Q is positioned in the direction in which the vehicle V travels. When the obstacle Q is positioned in the direction in which the vehicle V travels, it is determined that the predetermined condition is met and the obstacle Q is detected. For example, when the obstacle Q is positioned behind the rear end of the vehicle V while the vehicle V is reversing, it is determined that the predetermined condition is met and the obstacle Q is detected. More specifically, when the sensor that detects the obstacle Q behind the vehicle V among the sensor group 20 while the vehicle V is reversing, the controller 41 determines that the predetermined condition is met and detects the obstacle Q.

The controller 41 acquires information on the position of the obstacle Q with respect to the vehicle V (step S13). More specifically, the controller 41 acquires a position of the obstacle Q on the bird's-eye view video based on the obstacle information that is acquired by the obstacle information acquisition unit 43. The controller 41 then proceeds to step S14.

The controller 41 determines whether the obstacle Q is positioned on the synthesis boundary B of the bird's-eye view video (step S14). More specifically, based on the positional information on the obstacle Q that is acquired at step S13, the controller 41 determines whether the obstacle Q is on the travel-direction synthesis boundary B. When it is determined that the obstacle Q is in a position overlapping the synthesis boundary B of the bird's-eye view video 100 (YES at step S14), the controller 41 proceeds to step S15. When it is determined that the obstacle Q is not in a position overlapping the synthesis boundary B of the bird's-eye view video 100 (NO at step S14), the controller 41 proceeds to step S16.

The controller 41 changes the position of the virtual viewpoint (step S15). More specifically, the controller 41 causes the bird's-eye view video generator 45 to change the position of the virtual viewpoint P of the bird's-eye view video 100 and thus generate the bird's-eye view video 100A corresponding to the virtual viewpoint PA and causes the display panel 30 to display the bird's-eye view video 100A. The controller 41 then proceeds to step S17.

In the embodiment, the controller 41 causes the bird's-eye view video generator 45 to generate the bird's-eye view video 100A obtained by changing the position of the virtual viewpoint P to the virtual viewpoint PA on the side of the direction in which the vehicle V travels according to the direction in which the vehicle V travels.

The controller 41 generates and displays the bird's-eye view video 100 (step S16). More specifically, the controller 41 causes the bird's-eye view video generator 45 to generate the bird's-eye view video 100 from the surroundings video data, which is acquired by the video data acquisition unit 42, by performing the viewpoint conversion processing such that the vehicle V is looked down from above and causes the display panel 30 to display the bird's-eye view video 100. The controller 41 proceeds to step S17.

The controller 41 determines whether to end displaying the bird's-eye view video (step S17). More specifically, the controller 41 determines whether to end displaying the bird's-eye view video based on presence or absence of the reverse end trigger. The reverse end trigger refers to, for example, the situation where the shift position is changed from the "reverse" position to another position. When the reverse end trigger is present, the controller 41 determines to end displaying the bird's-eye view video (YES at step S17) and ends the process. When the reverse end trigger is absent, the controller 41 determines not to end displaying the bird's-eye view video (NO at step S17) and returns to step S12 to continue the process.

Figure 8:
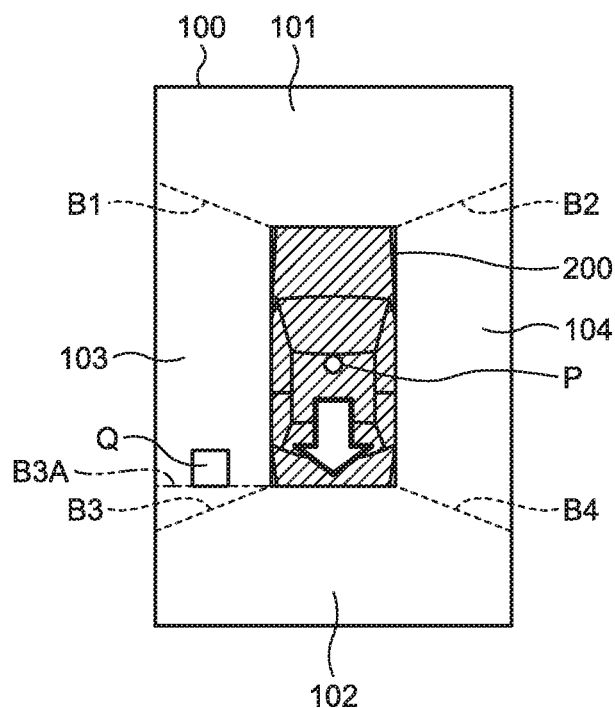
FIG. 8 is a diagram illustrating another example of the bird's-eye view video that is generated by the bird's-eye view video generation system according to the first embodiment.
Figure 9:
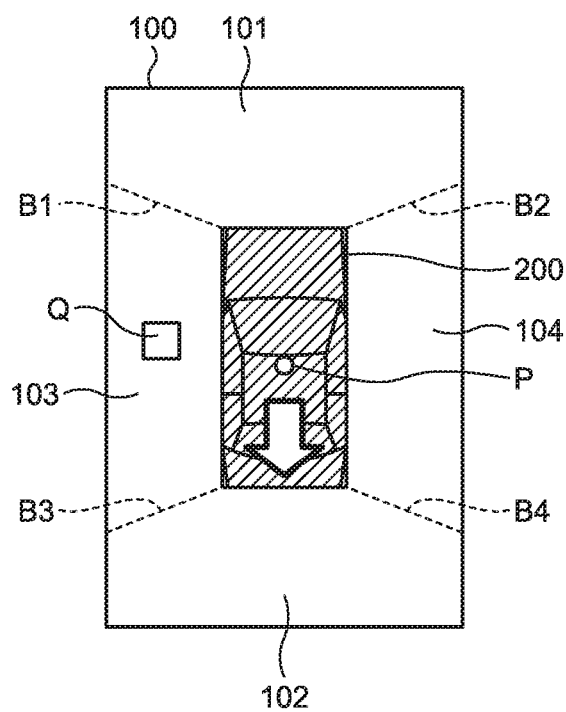
FIG. 9 is a diagram illustrating another example of the bird's-eye view video that is generated by the bird's-eye view video generation system according to the first embodiment.

Using FIG. 5, FIG. 6, FIG. 8 and FIG. 9, the case where the obstacle Q is detected behind when the vehicle goes backward will be described. FIG. 8 is a diagram illustrating another example of the bird's-eye view video that is generated by the bird's-eye view video generation system according to the first embodiment. FIG. 9 is a diagram illustrating another example of the bird's-eye view video that is generated by the bird's-eye view video generation system according to the first embodiment. The obstacle Q is positioned behind the rear end of the vehicle V on the left.

First, when the shift position is changed to the "reverse" position, at step S11, it is determined to start displaying a bird's-eye view video.

At step S12, the obstacle Q that is positioned behind the vehicle V is detected. At step S13, information representing that the position of the obstacle Q is behind the rear end of the vehicle V on the left is acquired. At step S14, it is determined that the obstacle Q is not on the synthesis boundary B3 of the bird's-eye view video 100. At step S16, the bird's-eye view video 100 corresponding to the virtual viewpoint P like that represented in FIG. 5 is generated and displayed on the display panel 30. At step S17, it is determined not to end displaying the bird's-eye view video and the process returns to step S12.

At step S12, the obstacle Q is detected and, at step S13, the position of the obstacle Q that gets close to the vehicle V is acquired. At step S14, it is determined that the obstacle Q is positioned on the synthesis boundary B3 of the bird's-eye view video 100. At step S15, the bird's-eye view video 100A corresponding to the virtual viewpoint PA like that represented in FIG. 6 is generated and displayed on the display panel 30. At step S17, it is determined not to end displaying the bird's-eye view video and the process returns to step S12.

In the bird's-eye view video 100A illustrated in FIG. 6, the obstacle Q is displayed behind the synthesis boundary B3A.

At step S13, information representing that the position of the obstacle Q is on the left and is close to the rear end of the vehicle V is acquired. At step S14, it is determined that the obstacle Q is not positioned on the synthesis boundary B3 of the bird's-eye view video 100. At step S16, the bird's-eye view video 100 corresponding to the virtual viewpoint P like that illustrated in FIG. 8 is generated and displayed on the display panel 30. At step S17, it is determined not to end displaying the bird's-eye view video and the process returns to step S12.

In the bird's-eye view video 100 illustrated in FIG. 8, the position of the synthesis boundary B is the same position as that of the synthesis boundary B of the bird's-eye view video 100 illustrated in FIG. 5. The obstacle Q is displayed in front of the synthesis boundary B3.

At step S13, information representing that the position of the obstacle Q is in front of the rear end of the vehicle V on the left is acquired. At step S14, it is determined that the obstacle Q is not positioned on the synthesis boundary B3 of the bird's-eye view video 100. At step S16, the bird's-eye view video 100 of the virtual viewpoint P like that illustrated in FIG. 9 is generated and displayed on the display panel 30. At step S17, it is determined not to end displaying the bird's-eye view video and the process returns to step S12.

In the bird's-eye view video 100 illustrated in FIG. 9, the position of the synthesis boundary B is the same position as that of the synthesis boundary B of the bird's-eye view video 100. The obstacle Q is displayed further in front of the synthesis boundary B3.

When the vehicle V further reverses, the obstacle Q is in a position where the obstacle Q crosses over the synthesis boundary B1 of the bird's-eye view video 100. However, the synthesis boundary B1 is not in the travel direction and thus the process of changing the position of the virtual viewpoint is not executed.

Such processes are repeated until displaying the bird's-eye view video is ended.

As described above, when the position of the obstacle Q overlaps the travel-direction synthesis boundary B, the bird's-eye view video generation system 1 generates the bird's-eye view video 100A obtained by changing the position of the virtual viewpoint P to the position on the side of the travel direction.

As described above, in the present embodiment, when the position of the obstacle Q overlaps the travel-direction synthesis boundary B, the bird's-eye view video 100A corresponding to the virtual viewpoint PA obtained by changing the position of the virtual viewpoint to the side of the direction in which the vehicle V travels according to the direction in which the vehicle V travels is generated. Accordingly, in the present embodiment, when the obstacle Q overlaps the travel-direction synthesis boundary B, it is possible to display the bird's-eye view video in which the obstacle Q does not overlap the synthesis boundary B by changing the position of the virtual viewpoint. Accordingly, it is possible to inhibit the obstacle Q from deforming or inhibit the obstacle Q from being not displayed due to the obstacle Q being positioned on the synthesis boundary B.

Accordingly, in the present embodiment, it is possible to display the obstacle Q appropriately in the bird's-eye view video. In the present embodiment, it is possible to improve visibility of the obstacle Q in the bird's-eye view video. In the present embodiment, it is possible to appropriately recognize the obstacle Q around the vehicle.

In the embodiment, the bird's-eye view video is generated by changing the position of the virtual viewpoint such that the display area which displays the direction in which the obstacle Q is detected in the bird's-eye view video increases. For example, when the obstacle Q is detected behind, the display area of the rear video 102A of the bird's-eye view video 100A corresponding to the direction in which the obstacle Q is detected is increased to be wider than the display area of the rear video 102 of the bird's-eye view video 100. Accordingly, in the present embodiment, it is possible to display the bird's-eye view video 100A in which the obstacle Q and its surroundings do not overlap the synthesis boundary B in a wider area. As described above, in the present embodiment, it is possible to appropriately display the obstacle Q and its surroundings in the bird's-eye view video. In the present embodiment, it is possible to appropriately check the obstacle Q and its surroundings around the vehicle.

In the embodiment, by changing the position of the virtual viewpoint according to the direction in which the vehicle V travels, it is possible to display a bird's-eye view video in which the obstacle Q is recognized more easily. Specifically, in the present embodiment, the bird's-eye view video 100A obtained by changing the position of the virtual viewpoint P to the position on the side of the direction in which the vehicle V travels is generated. Accordingly, in the present embodiment, it is possible to display the bird's-eye view video 100A representing that the vehicle V approaches to the obstacle Q as a reference. In other words, in the present embodiment, it is possible to display the bird's-eye view video 100A from a viewpoint like one to guide the vehicle V from the side of the direction in which the vehicle V travels. Accordingly, in the present embodiment, it is possible to make a display in which closeness of the vehicle V to the obstacle Q is recognized more easily. As described above, in the present embodiment, it is possible to appropriately display the obstacle Q in the bird's-eye view video.

In the present embodiment, when the position of the obstacle Q overlaps the travel-direction synthesis boundary B, the bird's-eye view video 100A corresponding to the virtual viewpoint PA is generated and displayed. In the present embodiment, when the position of the obstacle Q deviates from the position overlapping the travel-direction synthesis boundary B, the bird's-eye view video 100 corresponding to the virtual viewpoint P is generated and displayed. As described above, in the present embodiment, only while the position of the obstacle Q overlaps the travel-direction synthesis boundary B, the bird's-eye view video 100A corresponding to the virtual viewpoint PA is generated and displayed. Accordingly, in the present embodiment, the positon of the virtual viewpoint is not changed frequently and thus it is possible to inhibit display of the bird's-eye view video from being complicated.

In the present embodiment, when the position of the virtual viewpoint is changed, the vehicle icon changes. Accordingly, the driver is able to easily recognize that the position of the virtual viewpoint is changed.

Second Embodiment

Figure 10:
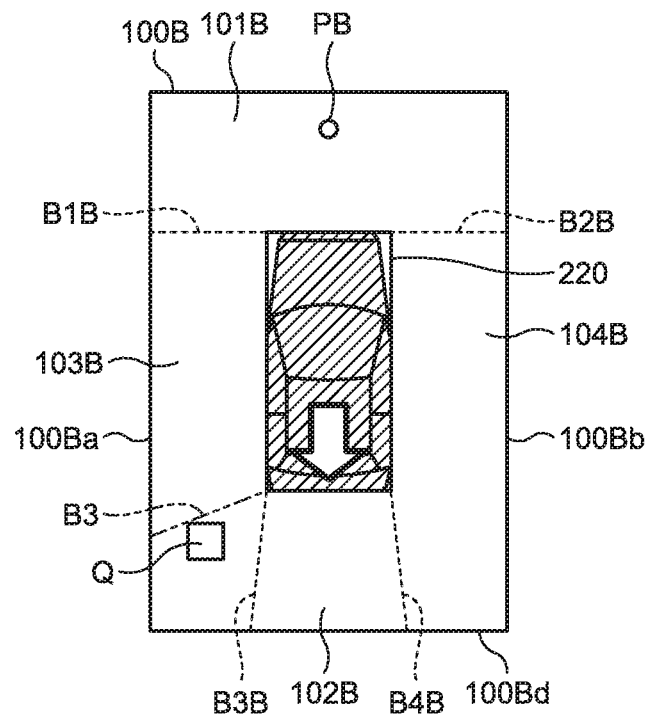
FIG. 10 is a diagram illustrating an example of a bird's-eye view video that is generated by a bird's-eye view video generation system according to a second embodiment.

With reference to FIG. 10, the bird's-eye view video generation system 1 according to the present embodiment will be described. FIG. 10 is a diagram illustrating an exemplary bird's-eye view video that is generated by the bird's-eye view video generation system according to a second embodiment. The basic configuration of the bird's-eye view video generation system 1 is the same as that of the bird's-eye view video generation system 1. In the following descriptions, the same components as those of the bird's-eye view video generation system 1 are denoted with the same reference numbers or their corresponding reference numbers and detailed descriptions of the components will be omitted. The bird's-eye view video generation system 1 of the present embodiment is different from the bird's-eye view video generation system 1 of the first embodiment in the process in the bird's-eye view video generator 45.

When the position of the obstacle Q that is specified by the obstacle information acquisition unit 43 overlaps the travel-direction synthesis boundary B, the bird's-eye view video generator 45 generates a bird's-eye view video 100B obtained by changing the position of the virtual viewpoint P to a virtual viewpoint PB on a side opposite to the direction in which the vehicle V travels. The position of a virtual viewpoint PB is represented by (xB,yB,zB).

For example, when the position of the obstacle Q overlaps the synthesis boundary B3 or the synthesis boundary B4 while the vehicle V is reversing, the bird's-eye view video generator 45 generates the bird's-eye view video 100B obtained by changing the position of the virtual viewpoint P to the viewpoint PB in front of the vehicle V.

For example, when the position of the obstacle Q overlaps the synthesis boundary B1 or the synthesis boundary B2 while the vehicle V is going forward, the bird's-eye view video generator 45 generates the bird's-eye view video 100B obtained by changing the position the virtual viewpoint P to the viewpoint PB behind the vehicle V.

When the position of the obstacle Q overlaps the travel-direction synthesis boundary B, the viewpoint conversion processor 451 generates a video obtained by performing the viewpoint conversion processing by changing the position of the viewpoint P to the side opposite to the direction in which the vehicle V travels.

For example, when the position of the obstacle Q overlaps the synthesis boundary B3 or the synthesis boundary B4 while the vehicle V is reversing, the viewpoint conversion processor 451 generates a video obtained by performing the viewpoint conversion processing by changing the position of the virtual viewpoint P to the virtual viewpoint PB in front of the vehicle V.

For example, when the position of the obstacle Q overlaps the synthesis boundary B1 or the synthesis boundary B2 while the vehicle V is going forward, the viewpoint conversion processor 451 generates a video obtained by performing the viewpoint conversion processing by changing the position of the virtual viewpoint P to the virtual viewpoint PB behind the vehicle V.

A flow of the processes performed by the bird's-eye view video generation device 40 of the bird's-eye view video generation system 1 will be described. The bird's-eye view video generation device 40 performs the processes according to the flowchart illustrated in FIG. 7. The present embodiment is different from the first embodiment in the process of step S15 and, as for the process of steps S11 to S14, step S16 and step S17, the same process as that of the first embodiment is performed.

The controller 41 changes the position of the virtual viewpoint (step S15). More specifically, the controller 41 causes the bird's-eye view video generator 45 to change the position of the virtual viewpoint P of the bird's-eye view video 100 to the side opposite to the direction in which the vehicle V travels and thus generate the bird's-eye view video 100B corresponding to the virtual viewpoint PB and causes the display panel 30 to display the bird's-eye view video 100B. The controller 41 proceeds to step S17.

Using FIG. 10, the case where, as in the first embodiment, the obstacle Q is detected behind when the vehicle goes backward will be described.

First, when the shift position is changed to the "reverse" position, at step S11, it is determined to start displaying a bird's-eye view video.

At step S12, the obstacle Q that is positioned behind the vehicle V is detected. At step S13, information representing that the position of the obstacle Q is behind the rear end of the vehicle V on the left is acquired. At step S14, it is determined that the obstacle Q is not on the synthesis boundary B3 of the bird's-eye view video 100. At step S16, the bird's-eye view video 100 corresponding to the virtual viewpoint P like that represented in FIG. 5 is generated and displayed on the display panel 30. At step S17, it is determined not to end displaying the bird's-eye view video and the process returns to step S12.

At step S12, the obstacle Q is detected and, at step S13, the position of the obstacle Q that gets close to the vehicle V is acquired. At step S14, it is determined that the obstacle Q is positioned on the synthesis boundary B3 of the bird's-eye view video 100. At step S15, the bird's-eye view video 100B corresponding to the virtual viewpoint PB like that represented in FIG. 10 is generated and displayed on the display panel 30. At step S17, it is determined not to end displaying the bird's-eye view video and the process returns to step S12.

Using FIG. 10, the generated bird's-eye view video 100B will be described. A vehicle icon 220 represents a mode where the vehicle V is looked down from front. The obstacle Q is displayed in front of the synthesis boundary B3B.

The display area of a front video 101B is wider backward at the ends on both sides than the display area of the front video 101. The display area of the front video 101B is wider than the display area of a rear video 102B. The display area of a left-side video 103B and the display area of a right-side video 104B are wider backward than the display area of the left-side video 103 and the display area of the right-side video 104.

A synthesis boundary B1B extends horizontally leftward from the front left end of the vehicle icon 220. The synthesis boundary B1B extends from the front left end of the vehicle icon 220 to a long side 100Ba. A synthesis boundary B2B extends horizontally rightward from the front right end of the vehicle icon 220. The synthesis boundary B2B extends from the front right end of the vehicle icon 220 to a long side 100Bb. A synthesis boundary B3B extends backward from the rear left end of the vehicle icon 220. The synthesis boundary B3B extends from the rear left end of the vehicle icon 220 to a short side 100Bd. A synthesis boundary B4B extends backward from the rear right end of the vehicle icon 220. The synthesis boundary B4B extends from the rear right end of the vehicle icon 220 to the short side 100Bd.

Near the synthesis boundary B3B and the synthesis boundary B4B, the surroundings video data from the left-side camera 13 and the right-side camera 14 has less distortion than that of the surroundings video data from the rear camera 12. For this reason, the synthesis boundary B3B and the synthesis boundary B4B are set such that the display area of the surroundings video data from the left-side camera 13 and the right-side camera 14 increases.

Near the synthesis boundary B1B and the synthesis boundary B2B, the surroundings video data from the front camera 11 has less distortion than that of the surroundings video data from the left-side camera 13 and the right-side camera 14. For this reason, the synthesis boundary B1B and the synthesis boundary B2B are set such that the display area of the surroundings video data from the front camera 11 increases.

At step S13, information representing that the position of the obstacle Q is on the left and is close to the rear end of the vehicle V is acquired. At step S14, it is determined that the obstacle Q is not positioned on the synthesis boundary B3 of the bird's-eye view video 100. At step S16, the bird's-eye view video 100 corresponding to the virtual viewpoint P like that represented in FIG. 8 is generated and displayed on the display panel 30. At step S17, it is determined not to end displaying the bird's-eye view video and the process returns to step S12.

At step S13, information representing that the position of the obstacle Q is in front of the rear end of the vehicle V on the left is acquired. At step S14, it is determined that the obstacle Q is not positioned on the synthesis boundary B3 of the bird's-eye view video 100. At step S16, the bird's-eye view video 100 corresponding to the virtual viewpoint P like that represented in FIG. 9 is generated and displayed on the display panel 30. At step S17, it is determined not to end displaying the bird's-eye view video and the process returns to step S12.

Such processes are repeated until displaying the bird's-eye view video is ended.

As described above, in the present embodiment, when the position of the obstacle Q overlaps the travel-direction synthesis boundary B, the bird's-eye view video 100B corresponding to the virtual viewpoint PB, which is the bird's-eye view video obtained by changing the position of the virtual viewpoint to the side opposite to the direction in which the vehicle V travels is generated. Accordingly, in the present embodiment, when the obstacle Q overlaps the travel-direction synthesis boundary B, it is possible to display the bird's-eye view video in which the obstacle Q does not overlap the synthesis boundary B by changing the virtual viewpoint. Accordingly, it is possible to inhibit the obstacle Q from deforming or inhibit the obstacle Q from being not displayed due to the obstacle Q being positioned on the synthesis boundary B. Accordingly, in the present embodiment, it is possible to display the obstacle Q appropriately in the bird's-eye view video. In the present embodiment, it is possible to improve visibility of the obstacle Q in the bird's-eye view video. In the present embodiment, it is possible to appropriately check the obstacle Q around the vehicle.

In the present embodiment, the bird's-eye view video 100B obtained by changing the position of the virtual viewpoint P to the side opposite to the direction in which the vehicle V travels is generated. Accordingly, in the present embodiment, it is possible to display the bird's-eye view video 100B from a viewpoint like one to guide the vehicle V from the side opposite to the direction in which the vehicle V travels. Accordingly, in the present embodiment, it is possible to make a display in which closeness of the vehicle V to the obstacle Q is recognized more easily. As described above, in the present embodiment, it is possible to appropriately display the obstacle Q in the bird's-eye view video.

Third Embodiment

Figure 11:
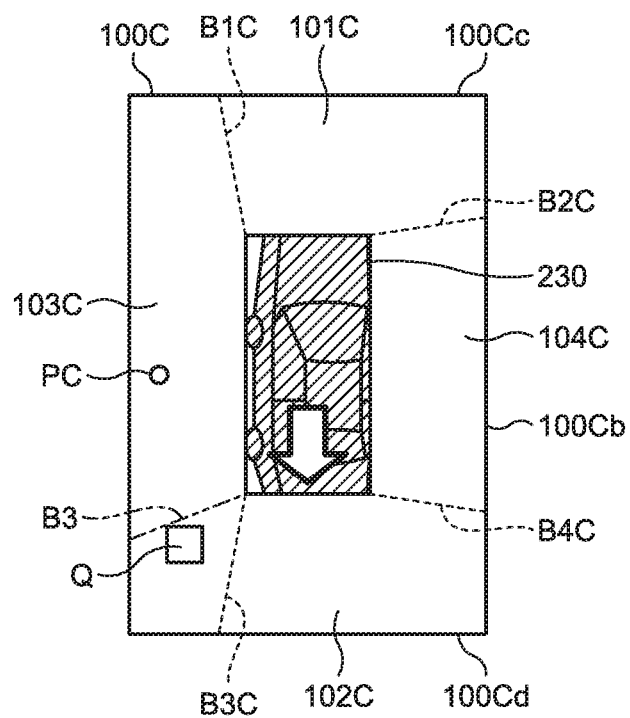
FIG. 11 is a diagram illustrating an example of a bird's-eye view video that is generated by a bird's-eye view video generation system according to a third embodiment.

With reference to FIG. 11, the bird's-eye view video generation system 1 according to the present embodiment will be described. FIG. 11 is a diagram illustrating an exemplary bird's-eye view video that is generated by the bird's-eye view video generation system according to a third embodiment. The bird's-eye view video generation system 1 of the present embodiment is different from the bird's-eye view video generation system 1 of the first embodiment in the process in the bird's-eye view video generator 45.

When the position of the obstacle Q that is specified by the obstacle information acquisition unit 43 overlaps the travel-direction synthesis boundary B, the bird's-eye view video generator 45 generates a bird's-eye view video 100C obtained by changing the position of the virtual viewpoint P to a position in a direction intersecting with the direction in which the vehicle V travels, for example, to a side.

For example, when the position of the obstacle Q overlaps the synthesis boundary B3 or the synthesis boundary B4 while the vehicle V is reversing, the bird's-eye view video generator 45 generates the bird's-eye view video 100C obtained by changing the position of the virtual viewpoint P to a viewpoint PC on the left side or the right side of the vehicle V. It is preferable that the virtual viewpoint PC be on the side on which the obstacle Q is detected. The position of the virtual viewpoint PC is represented by (xC,yC,zC).

For example, when the position of the obstacle Q overlaps the synthesis boundary B1 or the synthesis boundary B2 while the vehicle V is going forward, the bird's-eye view video generator 45 generates the bird's-eye view video 100C obtained by changing the position of the viewpoint virtual viewpoint P to a virtual viewpoint PC on the left or on the right of the vehicle V.

When the position of the obstacle Q overlaps the travel-direction synthesis boundary B, the viewpoint conversion processor 451 generates a video obtained by performing the viewpoint conversion processing by changing the position of the viewpoint P to a position in the direction intersecting with the direction in which the vehicle V travels.

For example, when the position of the obstacle Q overlaps the synthesis boundary B3 or the synthesis boundary B4 while the vehicle V is reversing, the viewpoint conversion processor 451 generates a video obtained by performing the viewpoint conversion processing by changing the position of the virtual viewpoint P to the virtual viewpoint PC on the left or on the right of the vehicle V.

For example, when the position of the obstacle Q overlaps the synthesis boundary B1 or the synthesis boundary B2 while the vehicle V is going forward, the viewpoint conversion processor 451 generates a video obtained by performing the viewpoint conversion processing by changing the position of the virtual viewpoint P to the virtual viewpoint PC on the left or on the right of the vehicle V.

A flow of the processes performed by the bird's-eye view video generation device 40 of the bird's-eye view video generation system 1 will be described. The bird's-eye view video generation device 40 performs the processes according to the flowchart illustrated in FIG. 7. The present embodiment is different from the first embodiment in the process of step S15 and, as for the process of steps S11 to S14, step S16 and step S17, the same process as that of the first embodiment is performed.

The controller 41 changes the position of the virtual viewpoint (step S15). More specifically, the controller 41 causes the bird's-eye view video generator 45 to change the position of the virtual viewpoint P of the bird's-eye view video 100 to a position in the direction intersecting with the direction in which the vehicle V travels and thus generate the bird's-eye view video 100C corresponding to the virtual viewpoint PC and causes the display panel 30 to display the bird's-eye view video 100C. The controller 41 proceeds to step S17.

Using FIG. 11, the case where, as in the first embodiment, the obstacle Q is detected behind when the vehicle goes backward will be described.

First, when the shift position is changed to the "reverse" position, at step S11, it is determined to start displaying a bird's-eye view video.

At step S12, the obstacle Q that is positioned behind the vehicle V is detected. At step S13, information representing that the position of the obstacle Q is behind the rear end of the vehicle V on the left is acquired. At step S14, it is determined that the obstacle Q is not on the synthesis boundary B3 of the bird's-eye view video 100. At step S16, the bird's-eye view video 100 corresponding to the virtual viewpoint P like that represented in FIG. 5 is generated and displayed on the display panel 30. At step S17, it is determined not to end displaying the bird's-eye view video and the process returns to step S12.

At step S12, the obstacle Q is detected and, at step S13, the position of the obstacle Q that gets close to the vehicle V is acquired. At step S14, it is determined that the obstacle Q is positioned on the synthesis boundary B3 of the bird's-eye view video 100. At step S15, the bird's-eye view video 100C corresponding to the virtual viewpoint PC like that represented in FIG. 11 is generated and displayed on the display panel 30. At step S17, it is determined not to end displaying the bird's-eye view video and the process returns to step S12.

Using FIG. 11, the generated bird's-eye view video 100C will be described. A vehicle icon 230 represents a mode where the vehicle V is looked down from the left. The obstacle Q is displayed in front of a synthesis boundary B3C.

The display area of a front video 101C and the display area of a rear video 102C are narrower than the display area of the front video 101 and the display area of the rear video 102. The display area of a left-side video 103C is wider than the display area of the left-side video 103 in the longitudinal direction. The display area of the left-side video 103C is wider than the display area of a right-side video 104C. The display area of the right-side video 104C is equal to the display area of the right-side video 104.

A synthesis boundary B1C extends forward from the front left end of a vehicle icon 230. A synthesis boundary B1C extends from the front left end of the vehicle icon 230 to a short side 100Cc. A synthesis boundary B2C extends rightward from the front right end of the vehicle icon 230. The synthesis boundary B2C extends from the front right end of the vehicle icon 230 to a long side 100Cb. A synthesis boundary B3C extends backward from the rear left end of the vehicle icon 230. The synthesis boundary B3C extends from the rear left end of the vehicle icon 230 to a short side 100Cd. A synthesis boundary B4C extends rightward from the rear right end of the vehicle icon 230. The synthesis boundary B4C extends from the rear right end of the vehicle icon 230 to the long side 100Cb.

Near the synthesis boundary B3C, the surroundings video data from the left-side camera 13 has less distortion than that of the surroundings video data from the rear camera 12. For this reason, the synthesis boundary B3C is set such that the display area of the surroundings video data from the left-side camera 13 increases.

Near the synthesis boundary B1C, the surroundings video data from the left-side camera 13 has less distortion than that of the surroundings video data from the front camera 11. For this reason, the synthesis boundary B1C is set such that the display area of the surroundings video data from the left-side camera 13 increases.

At step S13, information representing that the position of the obstacle Q is on the left and is close to the rear end of the vehicle V is acquired. At step S14, it is determined that the obstacle Q is not on the synthesis boundary B3 of the bird's-eye view video 100. At step S16, the bird's-eye view video 100 corresponding to the virtual viewpoint P like that represented in FIG. 8 is generated and displayed on the display panel 30. At step S17, it is determined not to end displaying the bird's-eye view video and the process returns to step S12.

At step S13, information representing that the position of the obstacle Q is in front of the rear end of the vehicle V on the left is acquired. At step S14, it is determined that the obstacle Q is not positioned on the synthesis boundary B3 of the bird's-eye view video 100C. At step S16, the bird's-eye view video 100 corresponding to the virtual viewpoint P like that represented in FIG. 9 is generated and displayed on the display panel 30. At step S17, it is determined not to end displaying the bird's-eye view video and the process returns to step S12.

Such processes are repeated until displaying the bird's-eye view video ends.

As described above, in the present embodiment, when the position of the obstacle Q overlaps the travel-direction synthesis boundary B, the bird's-eye view video 100C corresponding to the virtual viewpoint PC, which is the bird's-eye view video obtained by changing the position of the virtual viewpoint to the point in the direction intersecting with the direction in which the vehicle V travels, is generated. Accordingly, in the present embodiment, when the obstacle Q overlaps the travel-direction synthesis boundary B, it is possible to display the bird's-eye view video in which the obstacle Q does not overlap the synthesis boundary B by changing the virtual viewpoint. Accordingly, it is possible to inhibit the obstacle Q from deforming or inhibit the obstacle Q from being not displayed due to the obstacle Q being positioned on the synthesis boundary B. Accordingly, in the present embodiment, it is possible to display the obstacle Q appropriately in the bird's-eye view video. In the present embodiment, it is possible to improve visibility of the obstacle Q in the bird's-eye view video. In the embodiment, it is possible to appropriately check the obstacle Q around the vehicle.

In the present embodiment, the bird's-eye view video 100C obtained by changing the position of the virtual viewpoint P to the position in the direction intersecting with the direction in which the vehicle V travels is generated. Accordingly, in the present embodiment, it is possible to display the bird's-eye view video 100C corresponding to the virtual viewpoint PC like one to guide the vehicle V from the side of the vehicle. Accordingly, in the present embodiment, it is possible to make a display in which closeness of the vehicle V to the obstacle Q is recognized more easily. As described above, in the embodiment embodiment, the driver is able to appropriately check the obstacle Q around the vehicle.

Fourth Embodiment

Figure 12:
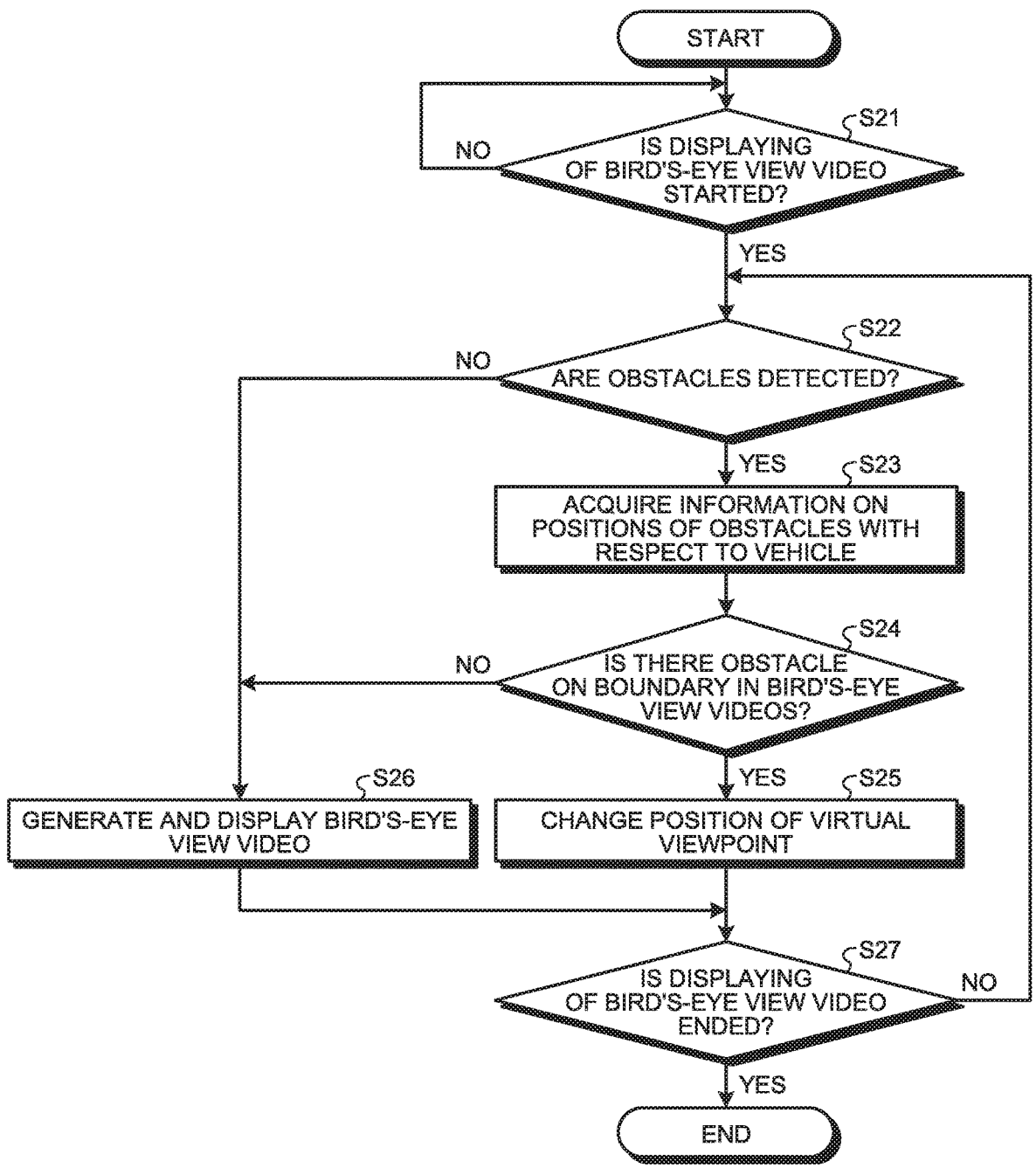
FIG. 12 is a flowchart illustrating a flow of processes in a bird's-eye view video generation device of a bird's-eye view video generation system according to a fourth embodiment.
Figure 13:
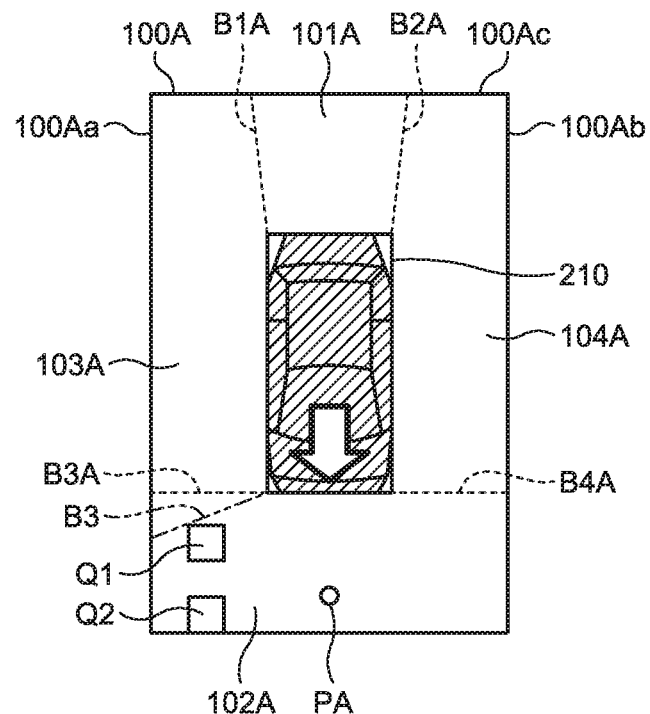
FIG. 13 is a diagram illustrating an example of a bird's-eye view video that is generated by the bird's-eye view video generation system according to the fourth embodiment.
Figure 14:
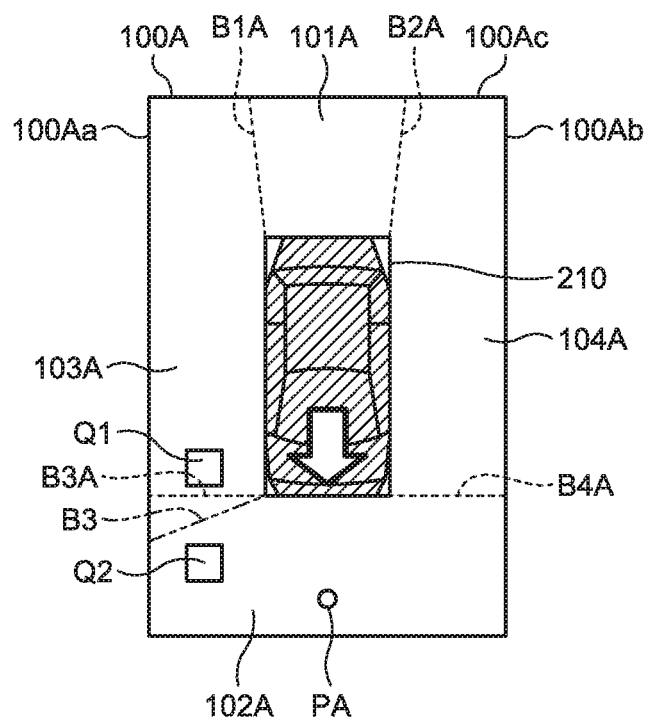
FIG. 14 is a diagram illustrating another example of the bird's-eye view video that is generated by the bird's-eye view video generation system according to the fourth embodiment.
Figure 15:
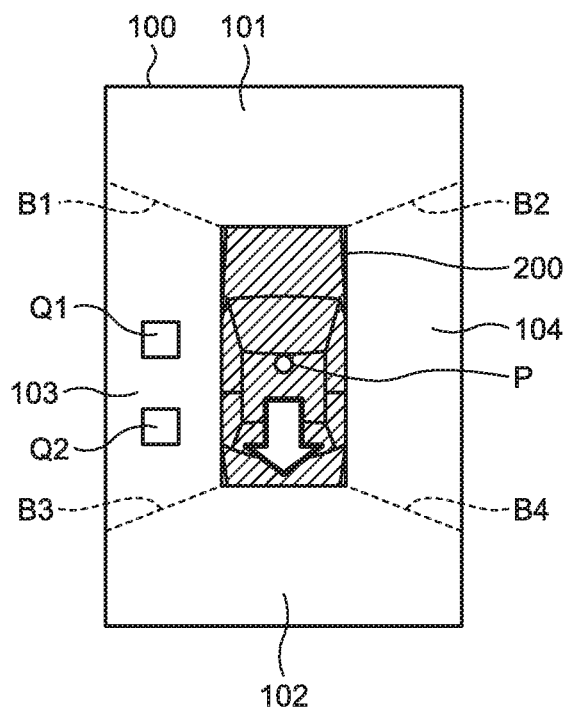
FIG. 15 is a diagram illustrating another example of the bird's-eye view video that is generated by the bird's-eye view video generation system according to the fourth embodiment.

With reference to FIGS. 12 to 15, the bird's-eye view video generation system 1 according to the present embodiment will be described. FIG. 12 is a flowchart of a flow of processes in a bird's-eye view video generation device of a bird's-eye view video generation system according to a fourth embodiment. FIG. 13 is a diagram illustrating an example of a bird's-eye view video that is generated by the bird's-eye view video generation system according to the fourth embodiment. FIG. 14 is a diagram illustrating another example of the bird's-eye view video that is generated by the bird's-eye view video generation system according to the fourth embodiment. FIG. 15 is a diagram illustrating another example of the bird's-eye view video that is generated by the bird's-eye view video generation system according to the fourth embodiment. The bird's-eye view video generation system 1 of the present embodiment is different from the bird's-eye view video generation system 1 of the second embodiment in the process in the bird's-eye view video generator 45. In the present embodiment, the case where multiple obstacles of the obstacles Q1 and an obstacle Q2 are detected is described.

A flow of the process that is performed by the bird's-eye view video generation device 40 of the bird's-eye view video generation system 1 will be described. As for the process of steps S21, S26, and S27, the same process as that of steps S11, S16, and S17 of the first embodiment is performed.

The controller 41 determines whether the obstacles Q are detected (step S22). More specifically, the controller 41 determines whether obstacle information on the obstacle Q that meets the predetermined condition is acquired. In the present embodiment, multiple obstacles Q meet the predetermined condition. When it is determined that the obstacle Q is detected (YES at step S22), the controller 41 proceeds to step S23. When it is determined that the obstacle Q is not detected (NO at step S22), the controller 41 proceeds to step S26.

The controller 41 acquires information on the positions of the obstacles Q (step S23). More specifically, the controller 41 acquires positons of all the obstacles Q on the bird's-eye view video based on the obstacle information that is acquired by the obstacle information acquisition unit 43. The controller 41 then proceeds to step S24.

The controller 41 determines whether there is the obstacle Q that is positioned on the synthesis boundary B of the bird's-eye view video (step S24). More specifically, as for the information on the position of the obstacle Q that is acquired at step S23, the controller 41 determines whether there is the obstacle Q in a position overlapping the travel-direction synthesis boundary B on the bird's-eye view video 100. The controller 41 determines whether there is the obstacle Q in a position that is expected to overlap the travel-direction synthesis boundary B in addition to the obstacle Q in the position overlapping the travel-direction synthesis boundary B. The obstacle Q in a position that is expected to overlap the travel-direction synthesis boundary B refers to the obstacle Q in a position that is expected to overlap the synthesis boundary B when the vehicle V moves in the travel direction. This reduces the number of times of changing the position of the virtual viewpoint.

When it is determined that there is the obstacle Q in a position overlapping the synthesis boundary B of the bird's-eye view video 100 (YES at step S24), the controller 41 proceeds to step S25. When it is determined that there is no obstacle Q in a position overlapping the synthesis boundary B of the bird's-eye view video 100 (NO at step S24), the controller 41 proceeds to step S26.

The controller 41 changes the position of the virtual viewpoint (step S25). More specifically, the controller 41 causes the bird's-eye view video generator 45 to change the position of the virtual viewpoint P of the bird's-eye view video 100 to the virtual viewpoint PA and thus generate the bird's-eye view video 100A corresponding to the virtual viewpoint PA, and causes the display panel 30 to display the bird's-eye view video 100A. The controller 41 then proceeds to step S27.

Using FIGS. 13 to 15, the case where two obstacles of the obstacle Q1 and the obstacle Q2 are detected behind when the vehicle V goes backward will be described. The multiple obstacles Q1 and Q2 are positioned behind the rear end of the vehicle V on the left.

First, when the shift position is changed to the "reverse" position at step S21, it is determined to start displaying a bird's-eye view video.

At step S22, the two obstacles Q1 and Q2 that are positioned behind the vehicle V are detected. At step S23, information representing that the position of the obstacle Q1 is on the synthesis boundary B3 in the bird's-eye view video is acquired. At step S24, it is determined that the obstacle Q1 is positioned on the synthesis boundary B3 of the bird's-eye view video 100. At step S25, the bird's-eye view video 100A corresponding to the virtual viewpoint PA like that represented in FIG. 13 is generated and displayed on the display panel 30. At step S27, it is determined not to end displaying the bird's-eye view video and the process returns to step S22.

In the bird's-eye view video 100A illustrated in FIG. 13, the position of the synthesis boundary B is the same position as that of the synthesis boundary B of the bird's-eye view video 100A illustrated in FIG. 6. The obstacle Q1 and the obstacle Q2 are positioned behind the synthesis boundary B3A.

At step S22, the obstacle Q1 and the obstacle Q2 are detected and, at step S23, information representing that the position of the obstacle Q1 is not a position on the synthesis boundary B3 of the bird's-eye view video is acquired. The position of the obstacle Q2 is not a position on the synthesis boundary B3 of the bird's-eye view video. However, it is expected that, when the vehicle V moves in the travel direction, the obstacle Q2 is in a position on the synthesis boundary B3. Accordingly, at step S24, it is determined that the obstacle Q2 is expected to be positioned on the synthesis boundary B3 of the bird's-eye view video 100A. At step S25, the bird's-eye view video 100A corresponding to the virtual viewpoint PA like that illustrated in FIG. 14 is generated and displayed on the display panel 30. At step S27, it is determined not to end displaying the bird's-eye view video and the process returns to step S22.

In the bird's-eye view video 100A illustrated in FIG. 14, the position of the synthesis boundary B is the same position as that of the synthesis boundary BA of the bird's-eye view video 100A illustrated in FIG. 13. The obstacle Q1 is positioned in front of the synthesis boundary B3A. The obstacle Q2 is positioned behind the synthesis boundary B3A.

At step S23, information representing that the positions of the two obstacles Q1 and Q2 are in front of the rear end of the vehicle V on the left is acquired. At step S24, it is determined that the two obstacles of the obstacle Q1 and the obstacle Q2 are not positioned on the synthesis boundary B3 of the bird's-eye view video 100A. At step S26, the bird's-eye view video 100 corresponding to the virtual viewpoint P like that illustrated in FIG. 15 is generated and displayed on the display panel 30. At step S27, it is determined not to end displaying the bird's-eye view video and the process returns to step S22.

In the bird's-eye view video 100 illustrated in FIG. 15, the position of the synthesis boundary B is the same position as that of the synthesis boundary B of the bird's-eye view video 100A illustrated in FIG. 6. The obstacle Q1 and the obstacle Q2 are positioned in front of the synthesis boundary B3.

Such processes are repeated until displaying the bird's-eye view video ends.

As described above, when the multiple obstacles Q are detected, the bird's-eye view video generation system 1 generates the bird's-eye view video 100A obtained by changing the virtual viewpoint while there is the obstacle Q that is positioned in the direction in which the vehicle V travels and that is expected to be positioned on the synthesis boundary B according to traveling of the vehicle V.

As described above, in the present embodiment, when the multiple obstacles Q are detected, the bird's-eye view video 100A obtained by changing the virtual viewpoint while there is the obstacle Q that is positioned in the direction in which the vehicle V travels and that is expected to be positioned on the synthesis boundary B when the vehicle V travels. Accordingly, in the present embodiment, it is possible to inhibit of the bird's-eye view video from being changed frequently. In this manner, in the present embodiment, it is possible to appropriately check the obstacle Q around the vehicle.

The bird's-eye view video generation system 1 according to the present application has been described. However, the present application may be carried out in various different modes in addition to the above-described embodiments.

The components of the bird's-eye view video generation system 1 illustrated in the drawings are functional ideas and need not necessarily be configured physically as illustrated in the drawings. In other words, the specific mode of each device is not limited to that illustrated in the drawings, and all or part of the devices may be distributed or integrated functionally or physically according to any unit and according to processing load on each device or situation in which the device is used.

The configuration of the bird's-eye view video generation system 1 is implemented by a program that is loaded as software into a memory. In the embodiment, the configuration has been described as functional blocks implemented by association among the sets of hardware or software. In other words, the functional blocks may be implemented with only hardware or only software or in various forms using combinations of hardware and software.

The above-described components include those easily assumable by those skilled in the art and those substantially the same as the above-described components. Furthermore, the above-described components may be combined as appropriate. Furthermore, it is possible to make various types of omission, replacement or change among the components within the scope of the present application.

The predetermined condition has been explained as a condition that the obstacle Q is positioned in the direction in which the vehicle V travels. However, the predetermined condition is not limited thereto. The predetermined condition may be a risk of interference with the vehicle V. The risk of interference with the vehicle V is, for example, being positioned in the direction in which the vehicle V travels and having a height from the ground with a risk of contact with the vehicle V.

The predetermined condition is, for example, that the obstacle is positioned in the direction in which the vehicle V travels and having an area smaller than an area of a beltlike shape extending with a predetermined width centering the synthesis boundary B. This is because the obstacle having an area larger than the area of a beltlike shape extending with a predetermined width centering the synthesis boundary B partly deviates from the area on which image processing is performed even when the virtual viewpoint is not changed and thus the video-captured object never not be displayed entirely.

Alternatively, the predetermined condition is, for example, that the obstacle is positioned in the direction in which the vehicle V travels and having the smallest distance to the vehicle V. This makes it possible to display a bird's-eye view video in which the obstacle Q that is, for example, the closest and thus has to be checked more preferentially among the multiple detected obstacles Q is checked easily.

At step S11, for example, the controller 41 may determine whether to start displaying a bird's-eye view video based on whether an operation to start displaying a bird's-eye view video on an operation unit is detected.

As for the bird's-eye view video obtained by changing the position of the virtual viewpoint, a bird's-eye view video in which the center of the vehicle icon is shifted from the center of the bird's-eye view video may be generated such that the display area in the direction in which the obstacle Q is detected increases.

In the second embodiment, after the bird's-eye view video 100B corresponding to the virtual viewpoint PB is generated and displayed, even when the vehicle V further goes backward, the obstacle Q is not positioned on the synthesis boundary. Therefore the bird's-eye view video 100B corresponding to the virtual viewpoint PB may be maintained without being returned to the bird's-eye view video 100 corresponding to the virtual viewpoint P.

According to the present application, an obstacle is displayed appropriately in a bird's-eye view video.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bird's-eye view video generation device comprising:
    a memory device;
    a controller that performs functions of multiple components including:
    a video data acquisition unit configured to acquire video data from a plurality of cameras configured to capture videos of surroundings of a vehicle;
    a bird's-eye view video generator configured to generate a first bird's-eye view video from a virtual viewpoint at a position above the vehicle by performing viewpoint conversion processing on the video data acquired by the video data acquisition unit to synthesize viewpoint-converted video;
    an obstacle information acquisition unit configured to acquire information from at least one detector configured to detect at least one obstacle around the vehicle and to specify a position of the detected obstacle on the first bird's-eye view video; and
    a display controller configured to display the first bird's-eye view video in a display, wherein, when the position of the detected obstacle that is specified by the obstacle information acquisition unit overlaps a synthesis boundary between videos in the first bird's-eye view video, the bird's-eye view video generator is further configured to generate a second bird's-eye view video obtained by changing the position of the virtual viewpoint of the first bird's-eye view video to a position from which the detected obstacle does not overlap the synthesis boundary in the first bird's-eye view video, and the bird's-eye view video generator is further configured to change the position of the virtual viewpoint to a position from which the detected obstacle does not overlap the synthesis boundary in the first bird's-eye view video due to a display area, after changing the position of the virtual viewpoint, of the viewpoint-converted video of the plurality of cameras in which the detected obstacle is contained becoming wider than that of the viewpoint-converted video before changing the position of the virtual viewpoint.

2. The bird's-eye view video generation device according to claim 1, further comprising a vehicle information acquisition unit configured to acquire a traveling direction of the vehicle,
    wherein, when the position of the obstacle that is specified by the obstacle information acquisition unit overlaps the synthesis boundary in the traveling direction of the vehicle, the bird's-eye view video generator is further configured to generate a new bird's-eye view video obtained by changing the position of the virtual viewpoint of the first bird's-eye view video to a position on a side of the traveling direction of the vehicle from which the detected obstacle does not overlap the synthesis boundary in the first bird's-eye view video.

3. The bird's-eye view video generation device according to claim 1, further comprising a vehicle information acquisition unit configured to acquire a traveling direction of the vehicle,
    wherein, when the position of the obstacle that is specified by the obstacle information acquisition unit overlaps the synthesis boundary in the traveling direction of the vehicle, the bird's-eye view video generator is further configured to generate a new bird's-eye view video obtained by changing the position of the virtual viewpoint of the first bird's-eye view video to a position on a side opposite to the traveling direction of the vehicle from which the detected obstacle does not overlap the synthesis boundary in the bird's-eye view video.

4. The bird's-eye view video generation device according to claim 1, further comprising a vehicle information acquisition unit configured to acquire a traveling direction of the vehicle,
    wherein, when the position of the obstacle that is specified by the obstacle information acquisition unit overlaps the synthesis boundary in the traveling direction of the vehicle, the bird's-eye view video generator is further configured to generate a new bird's-eye view video obtained by changing the position of the virtual viewpoint of the first bird's-eye view video to a position in a direction intersecting with the traveling direction of the vehicle from which the detected obstacle does not overlap the synthesis boundary in the first bird's-eye view video.

5. A bird's-eye view video generation system comprising:
    the bird's-eye view video generation device according to claim 1; and
    at least one of the cameras, the detector, and the display.

6. A bird's-eye view video generation method comprising:
    acquiring video data from a plurality of cameras that capture videos of surroundings of a vehicle;
    generating a first bird's-eye view video from a virtual viewpoint at a position above the vehicle by performing viewpoint conversion processing on the acquired video data to synthesize viewpoint-converted video;
    acquiring information from at least one detector configured to detect at least one obstacle around the vehicle and to specify a position of the detected obstacle on the first bird's-eye view video;

displaying the first bird's-eye view video in a display,
wherein, on generating the first bird's-eye view video,
when the specified position of the detected obstacle overlaps a synthesis boundary between videos in the first bird's-eye view video, generating a second bird's-eye view video obtained by changing the position of the virtual viewpoint of the first bird's-eye view video to a position from which the detected obstacle does not overlap the synthesis boundary in the first bird's-eye view video; and
changing the position of the virtual viewpoint to a position from which the detected obstacle does not overlap the synthesis boundary in the first bird's-eye view video due to a display area, after changing the position of the virtual viewpoint, of the viewpoint-converted video of the plurality of cameras in which the detected obstacle is contained becoming wider than that of the viewpoint-converted video before changing the position of the virtual viewpoint.

7. A non-transitory storage medium that stores a program for causing a computer that operates as a bird's-eye view video generation device to perform a process comprising:
acquiring video data from a plurality of cameras that capture videos of surroundings of a vehicle;
generating a first bird's-eye view video from a virtual viewpoint at a Position above the vehicle by performing viewpoint conversion processing on the acquired video data to synthesize viewpoint-converted video;
acquiring information from at least one detector configured to detect at least one obstacle around the vehicle and to specify a position of the detected obstacle on the first bird's-eye view video;
displaying the first bird's-eye view video in a display,
wherein, on generating the first bird's-eye view video,
when the specified position of the detected obstacle overlaps a synthesis boundary between videos in the first bird's-eye view video, generating a second bird's-eye view video obtained by changing the position of the virtual viewpoint of the first bird's-eye view video to a position from which the detected obstacle does not overlap the synthesis boundary in the first bird's-eye view video; and
changing the position of the virtual viewpoint to a position from which the obstacle does not overlap the synthesis boundary in the first bird's-eye view video due to a display area, after changing the position of the virtual viewpoint, of the viewpoint-converted video of the plurality of cameras in which the detected obstacle is contained becoming wider than that of the viewpoint-converted video before changing the position of the virtual viewpoint.

* * * * *